(12) United States Patent
Chen et al.

(10) Patent No.: US 9,016,575 B2
(45) Date of Patent: Apr. 28, 2015

(54) APPARATUS FOR AND METHOD OF UNIFORMLY ILLUMINATING FIELDS OF VIEW IN A POINT-OF-TRANSACTION WORKSTATION

(75) Inventors: Caihua Chen, Albany, NY (US); Edward Barkan, Miller Place, NY (US); Mark Drzymala, St. James, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 571 days.

(21) Appl. No.: 13/306,084

(22) Filed: Nov. 29, 2011

(65) Prior Publication Data

US 2013/0134220 A1    May 30, 2013

(51) Int. Cl.
| | | |
|---|---|---|
| *G06K 7/10* | (2006.01) | |
| *G06K 7/14* | (2006.01) | |
| *G03B 7/08* | (2006.01) | |
| *G06K 15/12* | (2006.01) | |
| *G06K 9/20* | (2006.01) | |

(52) U.S. Cl.
CPC ........ *G06K 7/10732* (2013.01); *G06K 7/10722* (2013.01); *G06K 9/2027* (2013.01); *G06K 7/10742* (2013.01); *G06K 7/1096* (2013.01)

(58) Field of Classification Search
USPC .......... 235/454, 455, 462.01, 462.24, 462.41, 235/462.42
See application file for complete search history.

(56) References Cited

U.S. PATENT DOCUMENTS

| | | | | |
|---|---|---|---|---|
| 5,777,743 | A * | 7/1998 | Bacchi et al. ................. | 356/370 |
| 5,783,811 | A * | 7/1998 | Feng et al. ............... | 235/462.42 |
| 5,828,427 | A * | 10/1998 | Faris ................................. | 349/5 |
| 6,000,612 | A * | 12/1999 | Xu ................................. | 235/454 |
| 6,105,869 | A * | 8/2000 | Scharf et al. ................... | 235/454 |
| 7,967,210 | B2 * | 6/2011 | Liu et al. .................. | 235/462.42 |
| 8,387,878 | B2 * | 3/2013 | Chen et al. .................... | 235/440 |
| 8,422,025 | B2 * | 4/2013 | Igaki .............................. | 356/488 |
| 8,450,708 | B2 * | 5/2013 | Liu et al. ....................... | 250/566 |
| 2004/0173681 | A1 * | 9/2004 | Toyama et al. ............... | 235/454 |
| 2004/0188527 | A1 * | 9/2004 | Tien ........................ | 235/462.42 |
| 2004/0195330 | A1 * | 10/2004 | Silverbrook et al. ......... | 235/454 |
| 2004/0195336 | A1 * | 10/2004 | Silverbrook et al. ..... | 235/462.43 |
| 2005/0105785 | A1 * | 5/2005 | Shigeta .......................... | 382/124 |
| 2006/0118627 | A1 * | 6/2006 | Joseph et al. ................. | 235/454 |
| 2006/0249584 | A1 * | 11/2006 | Bobba et al. ............. | 235/462.39 |
| 2007/0084927 | A1 * | 4/2007 | Itou et al. ...................... | 235/454 |

(Continued)

FOREIGN PATENT DOCUMENTS

EP          2040194 A2     3/2009

OTHER PUBLICATIONS

PCT International Search Report Dated January 7, 2013 for Counterpart Application PCT/US2012/062412.

*Primary Examiner* — Daniel Walsh
(74) *Attorney, Agent, or Firm* — Nong-Qiang Fan

(57) ABSTRACT

Indicia are imaged at a workstation having windows arranged in intersecting planes. The workstation also has solid-state imagers with fields of view that are split into intersecting subfields that look out through the windows, as well as illumination assemblies each having multiple light sources that illuminate each subfield with illumination light over an illumination field that overlaps a respective subfield. Light-modifying elements, such as lenses or baffles that are radially offset from the multiple light sources, condition the illumination light from the multiple light sources to be generally uniform in light intensity over at least one illuminated subfield.

12 Claims, 18 Drawing Sheets

(56) References Cited

U.S. PATENT DOCUMENTS

| | | |
|---|---|---|
| 2007/0175996 A1* | 8/2007 | Barkan et al. ............... 235/454 |
| 2007/0228306 A1* | 10/2007 | Gannon et al. ............... 250/555 |
| 2008/0035732 A1* | 2/2008 | Vinogradov et al. ..... 235/462.42 |
| 2008/0212168 A1* | 9/2008 | Olmstead et al. ............. 359/355 |
| 2008/0277475 A1* | 11/2008 | Kotlarsky et al. ......... 235/462.07 |
| 2009/0073856 A1* | 3/2009 | Wu et al. ................. 369/112.23 |
| 2009/0084848 A1 | 4/2009 | Liu et al. |
| 2009/0140050 A1* | 6/2009 | Liu et al. ................. 235/462.42 |
| 2009/0324111 A1* | 12/2009 | Kessels et al. ............... 382/232 |
| 2010/0051696 A1* | 3/2010 | Liu et al. ................. 235/462.42 |
| 2010/0078483 A1* | 4/2010 | Liu et al. ................. 235/462.42 |
| 2010/0111361 A1 | 5/2010 | Tan et al. |
| 2010/0163626 A1 | 7/2010 | Olmstead |
| 2010/0270376 A1 | 10/2010 | McQueen |
| 2011/0233278 A1* | 9/2011 | Patel et al. ............... 235/454 |
| 2012/0118962 A1* | 5/2012 | Barkan et al. ............... 235/454 |
| 2012/0118963 A1* | 5/2012 | Drzymala et al. ........... 235/454 |
| 2012/0273572 A1* | 11/2012 | Drzymala et al. ........... 235/454 |
| 2013/0001309 A1* | 1/2013 | Barkan ....................... 235/455 |
| 2013/0026233 A1* | 1/2013 | Chen et al. ................. 235/440 |
| 2013/0134220 A1* | 5/2013 | Chen et al. ................. 235/455 |
| 2013/0135513 A1* | 5/2013 | Choi et al. ................. 348/335 |

* cited by examiner

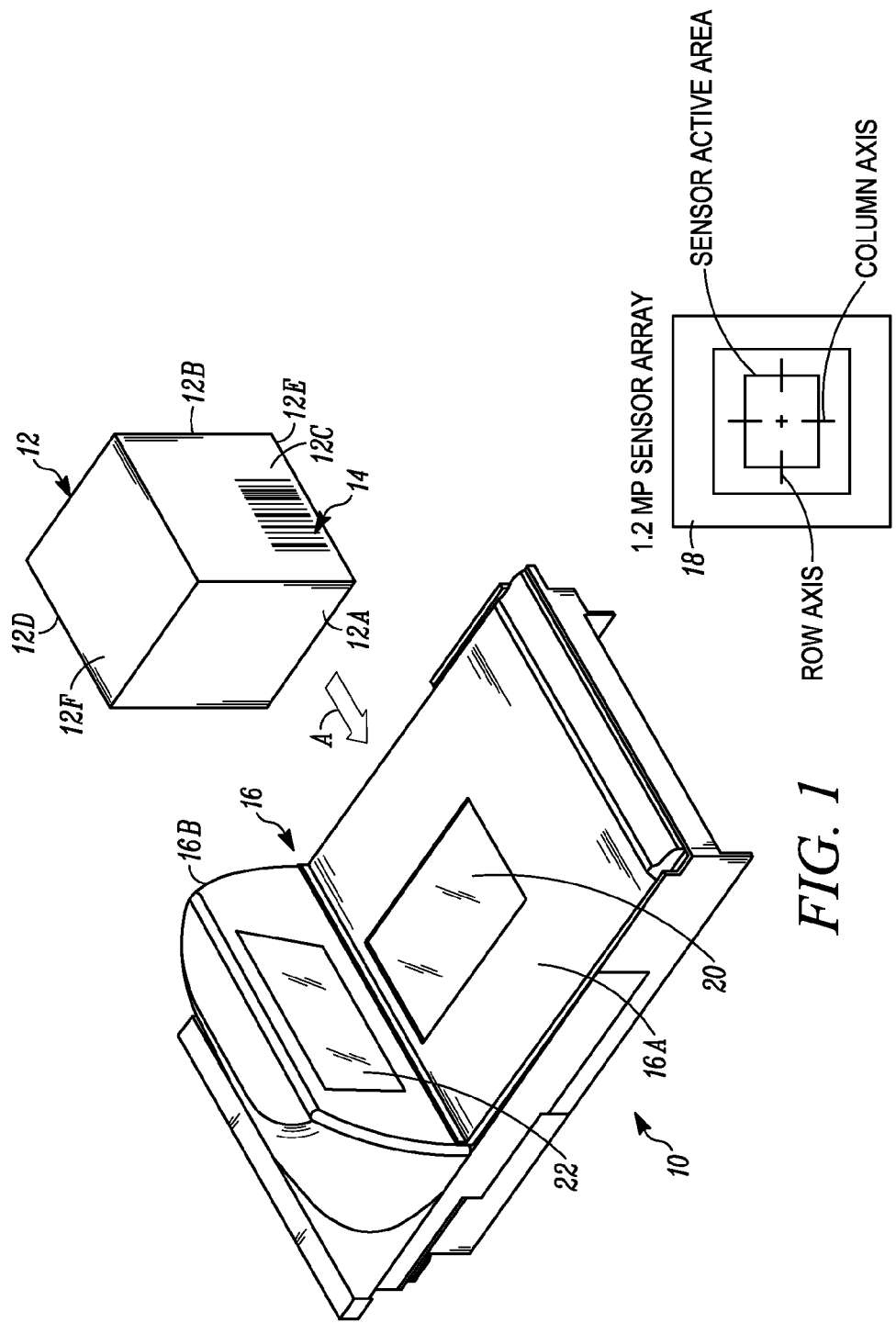

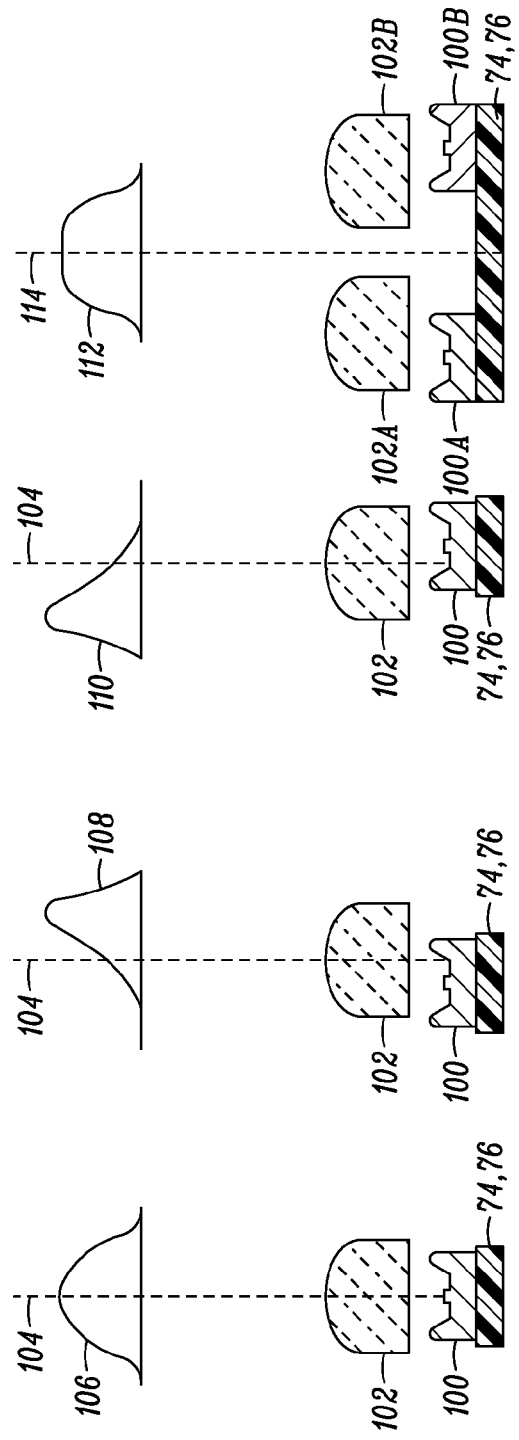
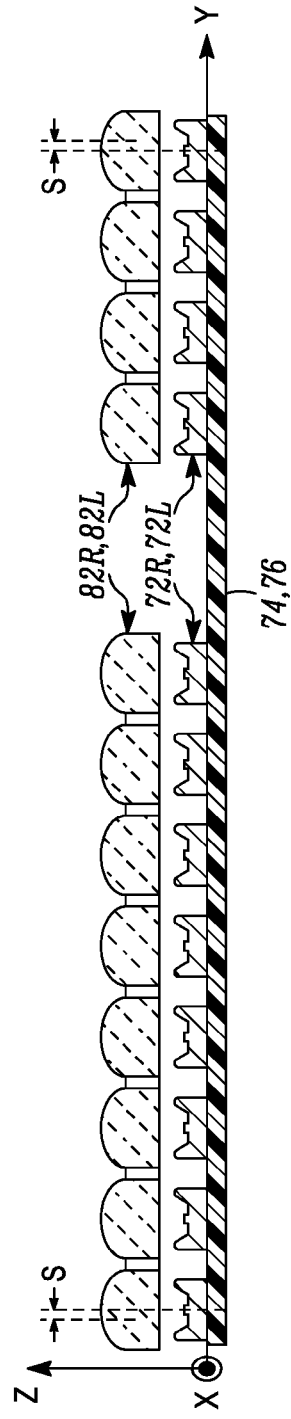

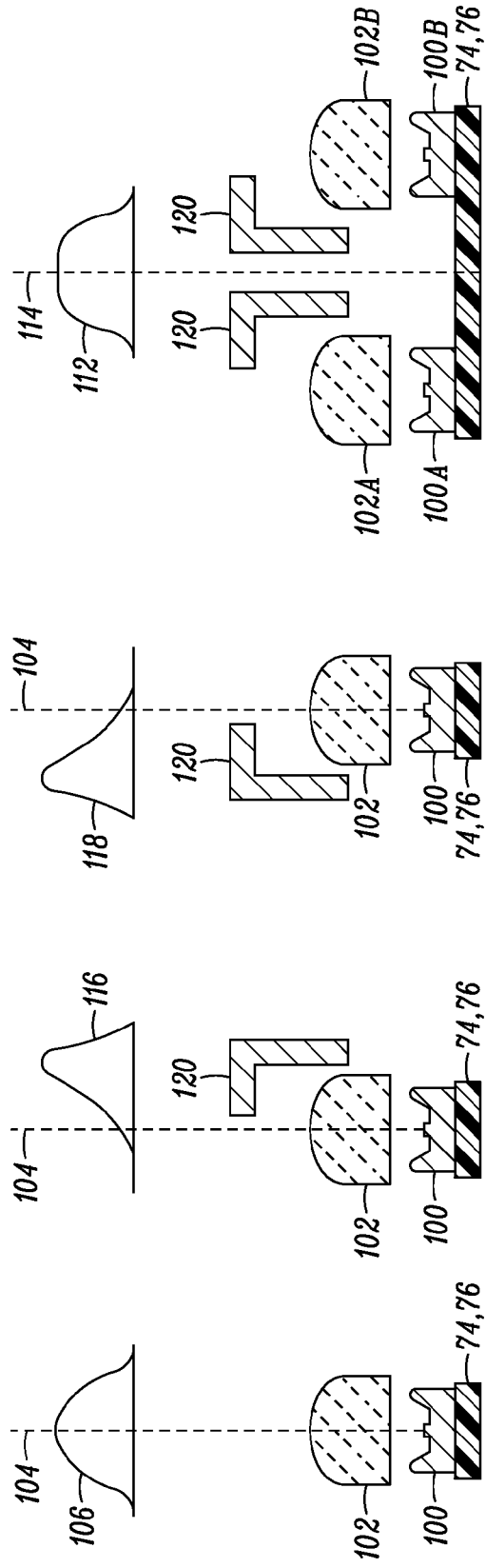

APPARATUS FOR AND METHOD OF UNIFORMLY ILLUMINATING FIELDS OF VIEW IN A POINT-OF-TRANSACTION WORKSTATION

FIELD OF THE DISCLOSURE

The present disclosure relates generally to an apparatus for, and a method of, uniformly illuminating fields of view in a point-of-transaction workstation and, more particularly, to uniformly illuminating subfields of view split from an imager in the workstation.

BACKGROUND

It was known to use laser-based and/or imager-based readers or scanners in a dual window or bi-optical workstation to electro-optically read targets or indicia, such as bar code symbols, associated with three-dimensional products to be identified and processed, e.g., purchased, at a point-of-transaction workstation provided at a countertop of a checkout stand in supermarkets, warehouse clubs, department stores, and other kinds of retailers. The products were typically slid or moved by a user across, or presented to and momentarily held steady at a central region of, a generally horizontal window that faced upwardly above the countertop and/or a generally vertical or upright window that rose above the countertop. When at least one laser scan line generated by a laser-based reader swept over a symbol and/or when return light from a symbol was captured over a field of view by a solid-state imager of an imager-based reader, the symbol was then processed, decoded and read, thereby identifying the product.

The symbol could be located low or high, or right to left, on the product, or anywhere in between, on any of six sides of the product. The symbol could be oriented in a picket fence orientation in which elongated parallel bars of a one-dimensional Universal Product Code (UPC) symbol were vertical, or in a ladder orientation in which the UPC symbol bars were horizontal, or at any orientation angle in between. The products could be held by the user at various tilt angles during their movement across, or presentation to, either window. The products could be moved relative to the windows in various directions, for example, from right-to-left, or left-to-right, and/or in-and-out, or out-and-in, and/or high-to-low, or low-to-high, or any combination of such directions, or could be positioned either in contact with, or held at a working distance away from, either window during such movement or presentation. All these factors made the symbol location variable and difficult to predict in advance.

As advantageous as workstations with laser-based readers were in processing transactions, workstations with imager-based readers, also known as imagers or cameras, were thought to offer improved reliability and had the added capability of reading indicia other than UPC symbols, such as two-dimensional or stacked or truncated symbols, as well as the capability of imaging non-symbol targets, such as receipts, driver's licenses, signatures, etc. Early all imager-based workstations required about ten to twelve, or at least six, imagers having multiple, intersecting fields of view extending through the windows in order to provide a full coverage scan zone in front of the windows to enable reliable reading of indicia that could be positioned anywhere on all six sides of a three-dimensional product. To bring the cost of the imager-based workstation down to an acceptable level, it was known to reduce the need for the aforementioned six to twelve imagers down to two imagers, or even one imager, by splitting the field of view of at least one of the imagers into a plurality of subfields of view, each additional subfield serving to replace an additional imager. These subfields also intersected each other in order to again provide a full coverage scan zone that extended above the horizontal window and in front of the upright window as close as possible to the countertop, and sufficiently high above the countertop, and as wide as possible across the width of the countertop. The scan zone projected into space away from the windows and grew in volume rapidly in order to cover indicia on products that were positioned not only on the windows, but also at working distances therefrom.

Each imager included an array of image sensors, and typically had an associated illuminator or illumination assembly to illuminate the indicia with illumination light over an illumination field. The image sensors detected the return illumination light reflected and/or scattered from the indicia. Each imager preferably operated at a frame rate of multiple frames per second, e.g., sixty frames per second, each frame lasting about 16.67 milliseconds. Each field of view, or each subfield, was preferably individually illuminated, and overlapped, by a respective illumination field and extended through at least one window over regions of the product. Each imager included either a global or a rolling shutter to help prevent image blur, especially when the indicia passed through the scan zone at high speed, e.g., on the order of 100 inches per second. Preferably, to reduce power consumption, to prolong operational lifetime, and to reduce bright light annoyance to operators and customers, the illumination light was not emitted at all times, but was emitted only when a proximity sensor detected the presence of a product entering the workstation. Upon product detection, the proximity sensor caused the illumination assembly to be activated.

The various multiple intersecting fields of view, or subfields, extended through a respective window along different directions, were typically differently sized to optimally cover the scan zone, and were typically simultaneously illuminated to reduce system complexity. As a result, some of the illuminated fields or subfields overlapped to different extents depending on the working distance away from a respective window. Thus, there was a substantial overlap between some of the illuminated fields or subfields at, or in a near field close to, the respective window, and less of an overlap in a far field remote from the respective window. Put another way, the illumination field in one or more fields or subfields was not uniform. There were bright areas, as a result of overlapping illuminated fields or subfields, in the scan zone, especially in the near field, arising from too much intensity of the return illumination light, as well as dim areas, as a result of less or no overlap of the illuminated fields or subfields, in the scan zone, especially in the far field, arising from too little intensity of the return illumination light. Each such bright area could tend to blind or saturate the imager, and each such dim area could tend to cause imaging performance of the imager to be less responsive and sluggish, or even fail.

To counter the deleterious effects of bright light in the near field and dim light in the far field, and to help insure good imaging performance, it was known to properly expose each imager. Each imager was provided with an internal auto-exposure circuit for measuring the intensity level of the return illumination light in the field of view of the imager, and for responsively adjusting the exposure duration of the imager. As advantageous as such an internal auto-exposure circuit was, it only adjusted the exposure duration of the imager in which it was internally integrated, typically only after a few frames had elapsed. This non-negligible time delay created a sluggishly performing workstation and was, in some cases, perceived as defective.

Also, the single auto-exposure circuit internal to the single imager could only adjust the exposure duration uniformly for all the image sensors of the imager. Thus, in the case where split subfields were generated from one imager, it was further known to employ dedicated exposure sensors, one for each subfield. This, however, increased system complexity and overall cost of manufacture and assembly.

Accordingly, it would be desirable to uniformly illuminate fields of view in a point-of-transaction workstation and, more particularly, to uniformly illuminate subfields of view split from an imager in the workstation and, still more particularly, to provide sufficient and uniform illumination both in the near and the far fields of the workstation to achieve a wide dynamic range of working distances in which indicia may be successfully and rapidly imaged and read.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 1 is a perspective view of a dual window, bi-optical, point-of-transaction workstation or imaging reader operative for reading indicia on a multi-sided product passing through the workstation by image capture;

FIG. 2 is a top plan view of a sensor array of an imager for use in the workstation of FIG. 1;

FIG. 17A is a part-diagrammatic, side view of an illumination beam waveform produced by a single light source and a single light-modifying lens element both symmetrically arranged on an optical axis;

FIG. 17B is a part-diagrammatic, side view of an illumination beam waveform produced by the single light source and the single light-modifying lens element of FIG. 17A, wherein the single light source and the single light-modifying lens element are radially offset relative to each other to one side of the optical axis;

FIG. 17C is a part-diagrammatic, side view of an illumination beam waveform produced by the single light source and the single light-modifying lens element of FIG. 17A, wherein the single light source and the single light-modifying lens element are radially offset relative to each other to an opposite side of the optical axis;

FIG. 17D is a part-diagrammatic, side view of an illumination beam waveform produced by the single light source and the offset single light-modifying lens element of FIG. 17B arranged adjacent to the single light source and the offset single light-modifying lens element of FIG. 17C;

FIG. 18 is a part-diagrammatic, side view of the representative illumination assembly of FIG. 15, with the light-modifying lens elements offset therefrom in accordance with said one embodiment of this invention;

FIG. 19A is a part-diagrammatic, side view of an unbaffled, illumination beam waveform produced by a single light source and a single light-modifying lens element both symmetrically arranged on a central optical axis;

FIG. 19B is a part-diagrammatic, side view of an illumination beam waveform produced by the single light source and the single light-modifying lens element of FIG. 19A, as modified by a single light-modifying baffle element radially offset to one side of the optical axis;

FIG. 19C is a part-diagrammatic, side view of an illumination beam waveform produced by the single light source and the single light-modifying lens element of FIG. 19A, as modified by a single light-modifying baffle element radially offset to an opposite side of the optical axis;

FIG. 19D is a part-diagrammatic, side view of an illumination beam waveform produced by the single light source and the baffled single light-modifying lens element of FIG. 19B arranged adjacent to the single light source and the baffled single light-modifying lens element of FIG. 19C.

Figure 3:
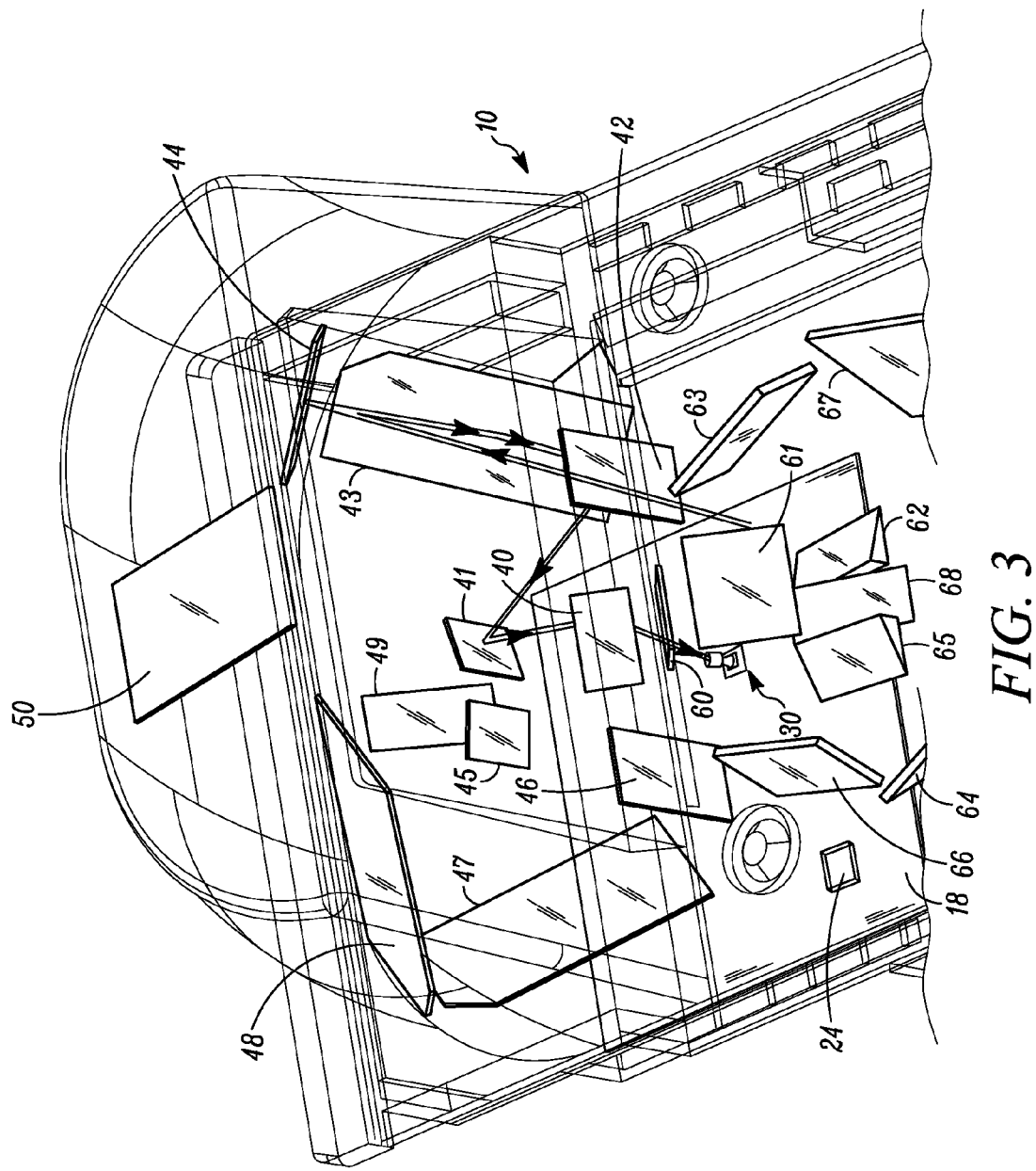
FIG. 3 is a broken-away, enlarged, perspective view of part of an optical system in the workstation of FIG. 1 diagrammatically depicting a folded optical path of an outer subfield of view of the imager of FIG. 2 for exit through an upright window.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

An apparatus or reader or workstation, in accordance with one feature of this invention, is operative for imaging indicia, and comprises a housing, a window supported by the housing, and a solid-state imager also supported by the housing and having an array of image sensors with a field of view. The apparatus also comprises an optical system supported by the housing and operative for splitting the field of view of the imager into a plurality of intersecting subfields of view that extend through and past the window to the indicia to be imaged. The apparatus also comprises a plurality of illumination assemblies, one for each subfield of view. Each illumination assembly has a plurality of illumination light sources for illuminating a respective subfield of view with illumination light over an illumination field that overlaps the respective subfield of view. The optical system is further operative for capturing the illumination light returned from the indicia in each illuminated subfield of view. A controller operatively connected to the imager and the illumination assemblies, processes the captured illumination light in at least one of the illuminated subfields of view. The apparatus also comprises a plurality of light-modifying elements, one for each illumination assembly. Each light-modifying element is operative for conditioning the illumination light from the plurality of illumination light sources to be generally uniform in light intensity over the at least one illuminated subfield of view. Thus, each uniformly illuminated subfield provides sufficient and uniform illumination both in a near field at, or close to, the window and in a far field remote from the window, to achieve a wide dynamic range of working distances in which indicia may be successfully and rapidly imaged and read.

Each illumination light source serves as a point source and emits an illumination light beam whose waveform has a maximum intensity along an illumination axis, and each illumination assembly has a plurality of the illumination light sources in close adjacent relationship. Preferably, the illumination light sources of each illumination assembly are light emitting diodes (LEDs) arranged in a row and commonly mounted on a printed circuit board.

In accordance with one embodiment of this invention, each light-modifying element includes a plurality of lenses having respective optical axes and at least partly overlying the closely adjacent plurality of the illumination light sources, with each illumination light source being offset from a respective lens in a direction radially of a respective optical axis to combine the illumination light beams from the closely adjacent plurality of the illumination light sources into a combined light beam having an intensity that is generally uniform over the at least one illuminated subfield of view.

In accordance with another embodiment of this invention, each light-modifying element includes a plurality of lenses overlying the closely adjacent plurality of the illumination light sources, and a plurality of baffles at least partly overlying the closely adjacent pluralities of the illumination light sources and the lenses, with each baffle being offset from a respective illumination light source and respective lens in a direction radially of a respective optical axis to combine the illumination light beams from the closely adjacent pluralities of the illumination light sources and the lenses into a combined light beam having an intensity that is generally uniform over the at least one illuminated subfield of view.

Turning now to the drawings, FIG. 1 depicts a dual window, bi-optical, point-of-transaction workstation 10 for electro-optically imaging indicia 14 or targets, such as the illustrated UPC symbol described above, associated with multi-sided, three-dimensional products 12, and is typically used by retailers to process transactions involving the purchase of the products 12 bearing, or printed with, the identifying indicia 14. The workstation 10 includes a housing 16 having a generally horizontal window 20 located in a generally horizontal plane and supported by a horizontal housing portion 16A, and an upright window 22 located in a generally upright plane that intersects the generally horizontal plane and supported by a raised housing portion 16B. The upright plane may lie in a vertical plane, or be slightly rearwardly or forwardly inclined relative to the vertical plane. The upright window 22 is preferably recessed within its housing portion 16B to resist scratching. By way of numerical example, the generally horizontal window 20 measures about four inches in width by about six inches in length, while the generally upright window 22 measures about six inches in width by about eight inches in length. The products are passed by an operator or a customer through a scan zone, which occupies the space at and above the horizontal window 20, and also occupies the space at and in front of the upright window 22.

The indicia 14 need not be a UPC symbol as illustrated, but could be another one-dimensional symbol of a different symbology, or any two-dimensional symbol, or stacked symbol, or various lengths of a truncated symbol of the type typically found on frequent shopper cards, coupons, loyalty cards. The indicia 14 could also be a non-symbol target, such as a personal check, a credit card, a debit card, a signature, a driver's license, the consumer himself or herself, or the operator himself or herself. Capturing an image of the driver's license is particularly useful since many licenses are encoded with two-dimensional indicia bearing age information, which is useful in validating a customer's age and the customer's ability to purchase age-related products, such as alcoholic beverages or tobacco products. Capturing an image of the operator is used for video surveillance for security purposes.

The product 12 need not be a three-dimensional box as illustrated, but can be any object having a left side 12A, a right side 12B, a front side 12C, a rear side 12D, a bottom side 12E, and a top side 12F. The product 12 is slid or moved by an operator or a customer across and past the windows 20, 22 in the direction of the arrow A through the scan zone, or is presented to a central region of either window. As described above, the product 12 can be tilted or moved in other directions through the workstation 10.

Figure 4:
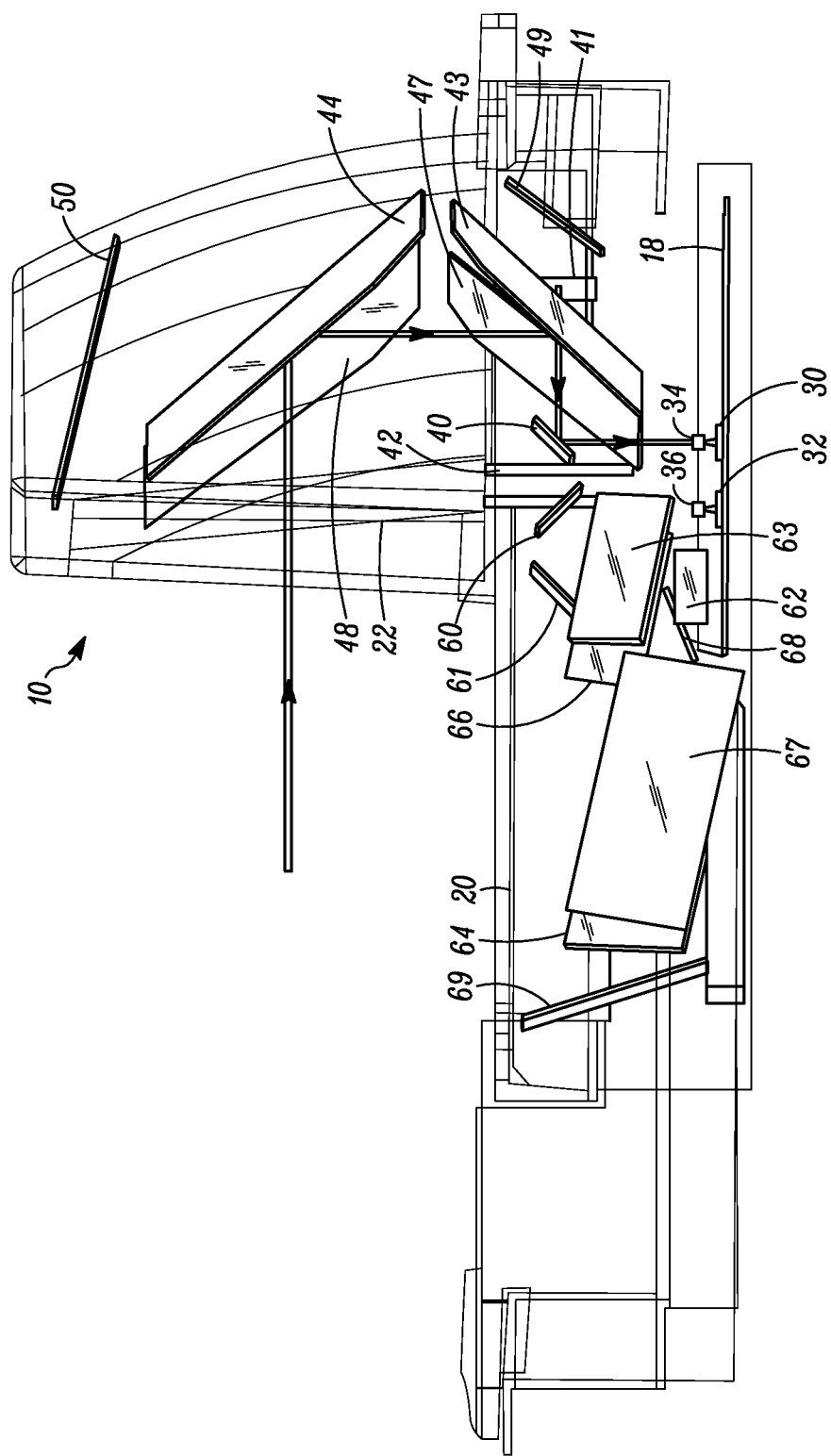
FIG. 4 is a side perspective, enlarged, view of the optical path of FIG. 3.
Figure 14:
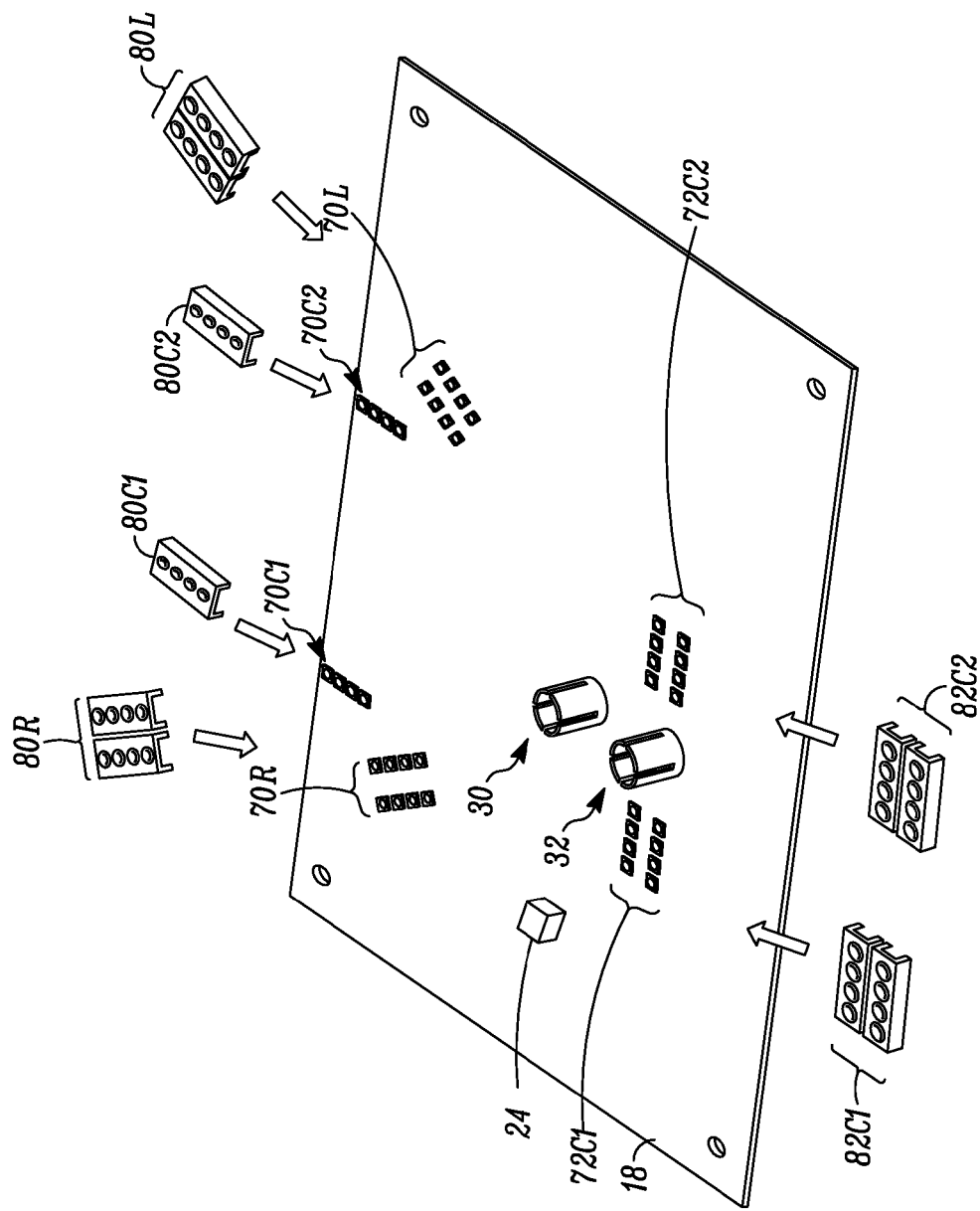
FIG. 14 is a perspective view of a plurality of illumination assemblies and a plurality of light-modifying elements in accordance with one embodiment of this invention commonly mounted on a main printed circuit board within the workstation of FIG. 1.

As best shown in FIGS. 3-4, a first solid-state imager 30 and a second solid-state imager 32 are commonly supported on a printed circuit board 18 within the housing (see also FIG. 14). Each imager 30, 32 has a sensor array of image sensors with a field of view diagrammatically shown by speckles in the various views. As described below, the field of view of the first imager 30 is directed out of the upright window 22; hence, the first imager 30 will be individually referred to as the vertical imager 30 for convenience. Similarly, the field of view of the second imager 32 is directed out of the horizontal window 20; hence, the second imager 32 will be individually referred to as the horizontal imager 32 for convenience.

Each imager 30, 32 preferably comprises a two-dimensional, charge coupled device (CCD) array, or a complementary metal oxide semiconductor (CMOS) array, of image sensors of megapixel size, e.g., 1280 pixels wide×960 pixels high. In a preferred embodiment, the field of view of each imager 30, 32 measures about 15 degrees by 30 degrees. The arrays of both imagers 30, 32 extend along mutually perpendicular, row and column, directions. Thus, as shown in FIG. 2, each imager has a row axis and a column axis. Each imager 30, 32 includes an imaging lens assembly 34, 36 (see FIG. 4) for capturing return light from the indicia and for projecting the captured return light onto the respective sensor array.

Each imager 30, 32 preferably has a shutter, typically a global shutter, that exposes each imager for an exposure time, preferably pre-set for the maximum anticipated exposure time needed to capture indicia at the maximum working distance away from each window. By way of example, the maximum exposure time can be set to a value between 400-750 microseconds. Each imager preferably operates at a frame rate of sixty frames per second, each frame lasting about 16.67 milliseconds. The shutter insures that the captured images will not be disturbed by motion of the indicia 14 relative to the window(s) during the exposure time. A rolling or a mechanical shutter could also be employed. The indicia 14 can be presented or swiped at speeds up to around 100 inches per second across any part of either window.

Figure 13:
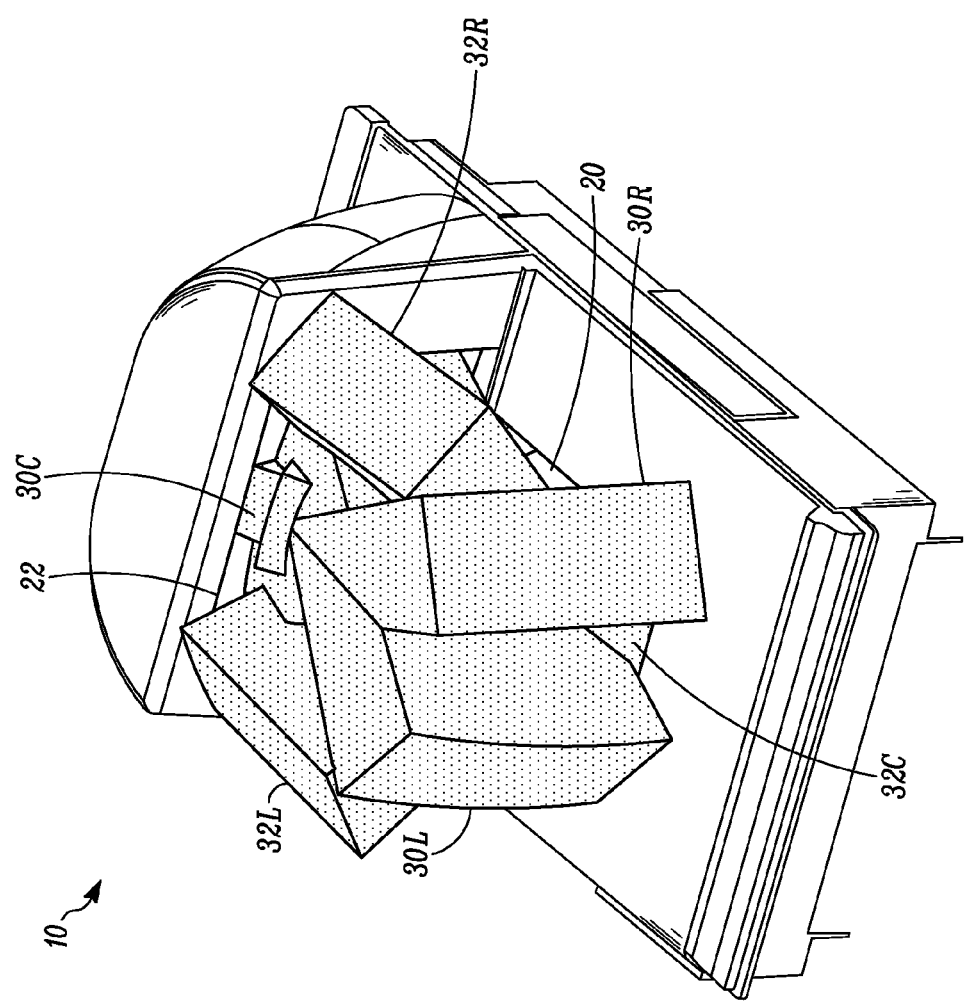
FIG. 13 is a perspective view of the workstation of FIG. 1 diagrammatically depicting all six subfields exteriorly of the windows.

An optical system is supported by the housing 16 and is operative for directing the captured return light along a first folded optical path from the upright window 22 to the vertical imager 30, and along a second folded optical path from the horizontal window 20 to the horizontal imager 32. As described in more detail below, the optical system is further operative for splitting the field of view of the vertical imager 30 into a plurality of subfields of view, namely a center subfield 30C flanked by two outer, right and left, subfields 30R, 30L, and for splitting the field of view of the horizontal imager 32 into a plurality of subfields of view, again a center subfield 32C flanked by two outer, right and left, subfields 32R, 32L. These various subfields outside of the windows 20, 22 are shown in FIG. 13.

The optical system has a plurality of fold mirrors each positioned in each of the first and second optical paths to fold the captured return light in the subfields of view. As shown in FIGS. 3-4, a first plurality of fold mirrors 40, 41, 42, 43 and 44 are positioned along a first optical path part between the vertical imager 30 and the upright window 22 to fold the captured return light in the outer subfield 30L to successively reflect off mirrors 44, 43, 42, 41 and 40, in that order, prior to being focused by the imaging lens assembly 34 onto the vertical imager 30. In analogous manner, a second plurality of fold mirrors 40, 45, 46, 47 and 48 are positioned along a second optical path part between the vertical imager 30 and the upright window 22 to fold the captured return light in the outer subfield 30R to successively reflect off mirrors 48, 47, 46, 45 and 40, in that order, prior to being focused by the imaging lens assembly 34 onto the vertical imager 30. A third plurality of fold mirrors 40, 49 and 50 are positioned along a third optical path part between the vertical imager 30 and the upright window 22 to fold the captured return light in the center subfield 30C to successively reflect off mirrors 50, 49 and 40, in that order, prior to being focused by the imaging lens assembly 34 onto the vertical imager 30.

Figure 5:
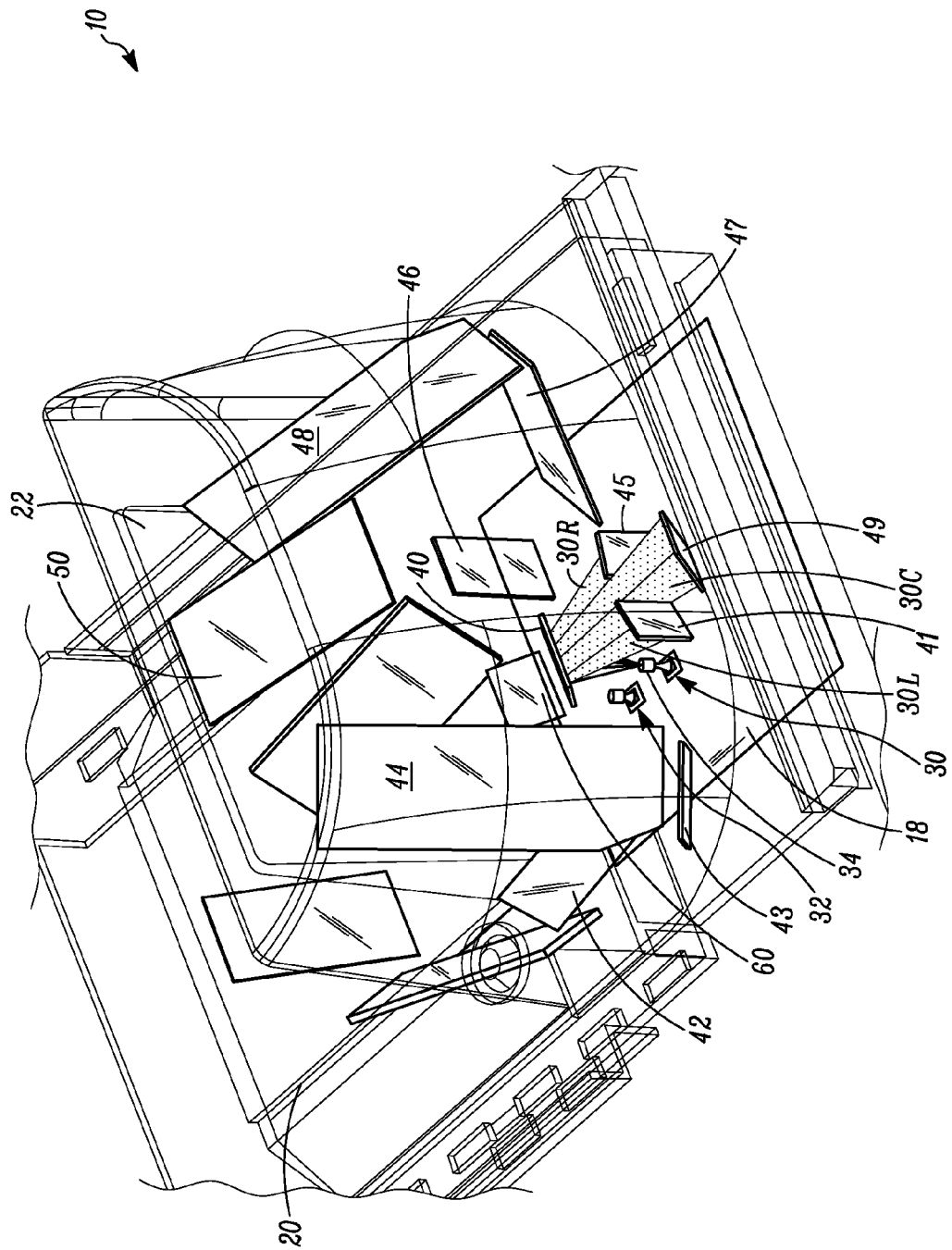
FIG. 5 is a rear perspective view of the optical system part of FIG. 3 depicting an optical splitter for splitting the field of view of the imager into a central subfield of view flanked by two outer subfields of view.
Figure 6:
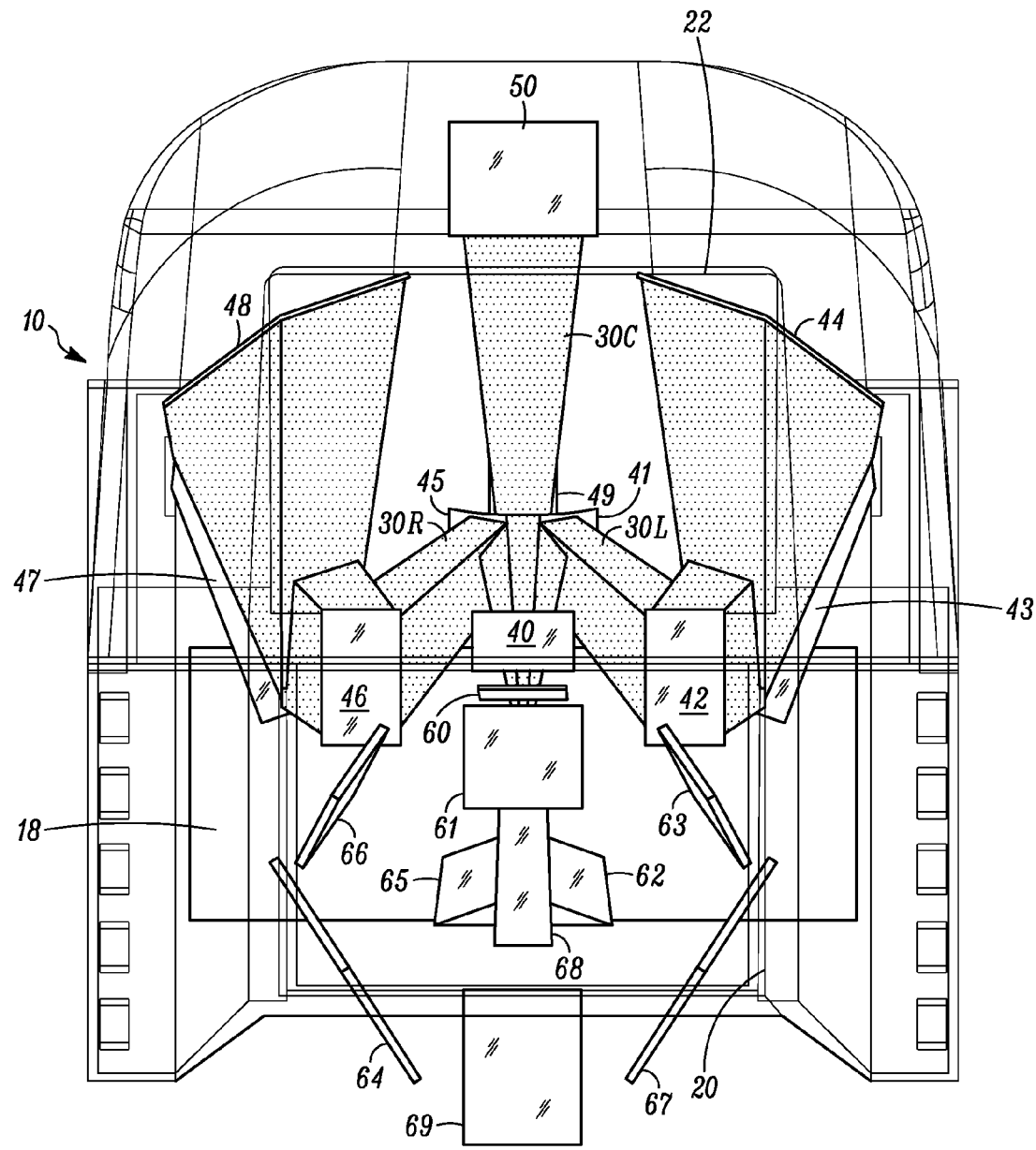
FIG. 6 is a top plan view of the optical system part of FIG. 3 diagrammatically depicting the subfields downstream of the optical splitter.
Figure 7:
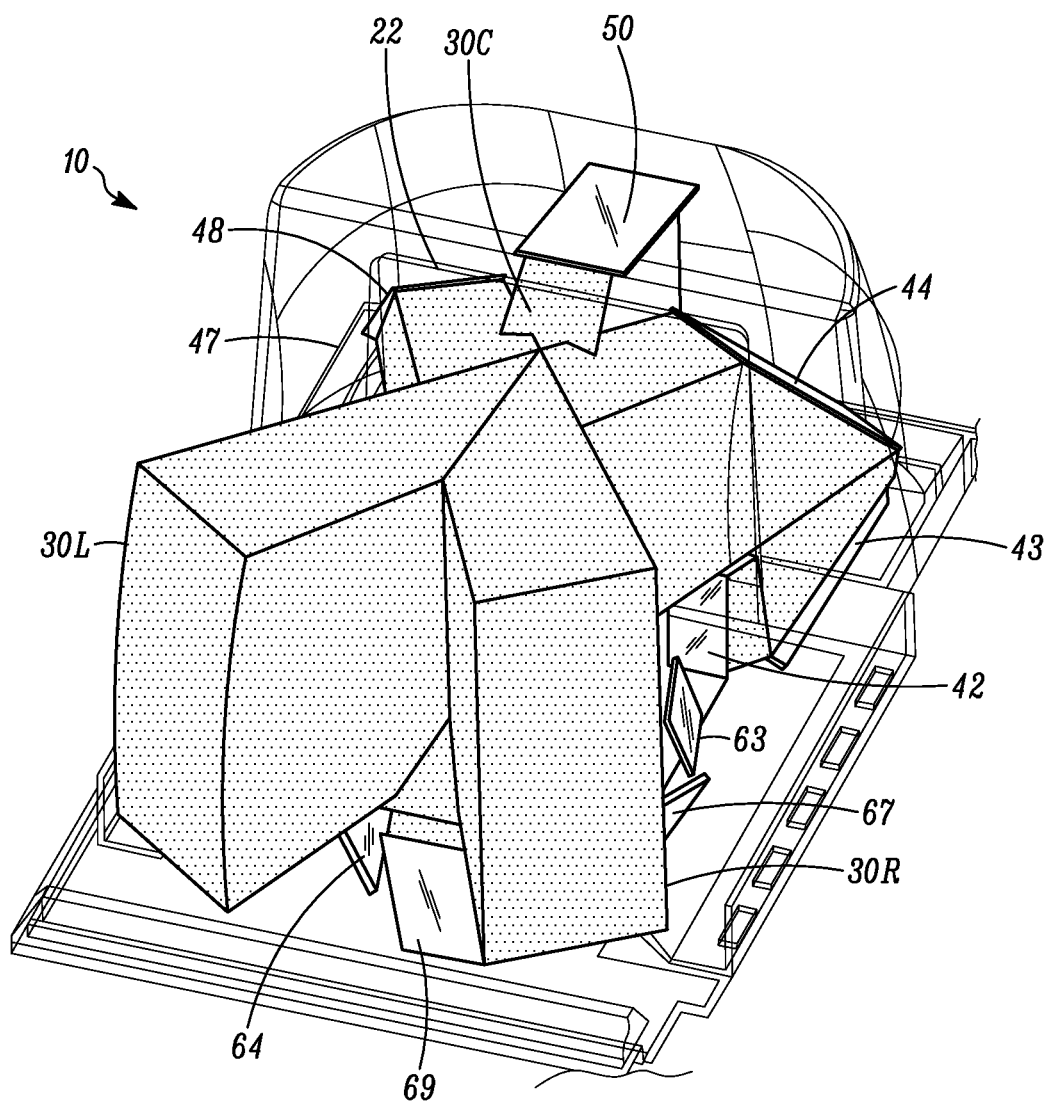
FIG. 7 is a perspective view of the optical system part of FIG. 3 diagrammatically depicting three subfields exteriorly of the upright window of the workstation of FIG. 1.

The aforementioned mirrors 41, 45 and 49, as best seen in FIG. 5, comprise a first optical splitter, wherein the mirror 49 splits a central part of the field of view of the vertical imager 30 into the center subfield 30C, wherein the mirror 41 splits an outer part of the field of view of the vertical imager 30 into the outer subfield 30L, and wherein the mirror 45 splits another outer part of the field of view of the vertical imager 30 into the outer subfield 30R. FIG. 6 best depicts, as seen from above, the separate passage and folding of the outer subfield 30L between the mirrors 44, 43, 42, 41 and 40, as seen from above, and also depicts the separate passage and folding of the outer subfield 30R between the mirrors 48, 47, 46, 45 and 40. FIG. 7 best depicts the separate passage and folding of the outer subfield 30L through the upright window 22 and onto the mirror 44, and the separate passage and folding of the outer subfield 30R through the upright window 22 and onto the mirror 48.

The above discussion for FIGS. 3-7 dealt with the various fold mirrors of the optical system for folding and splitting the subfields 30C, 30L and 30R between the upright window 22 and the vertical imager 30. The following discussion of FIGS. 8-12 deals with additional fold mirrors of the optical system for folding and splitting additional subfields 32C, 32L and 32R between the horizontal window 20 and the horizontal imager 32.

Figure 8:
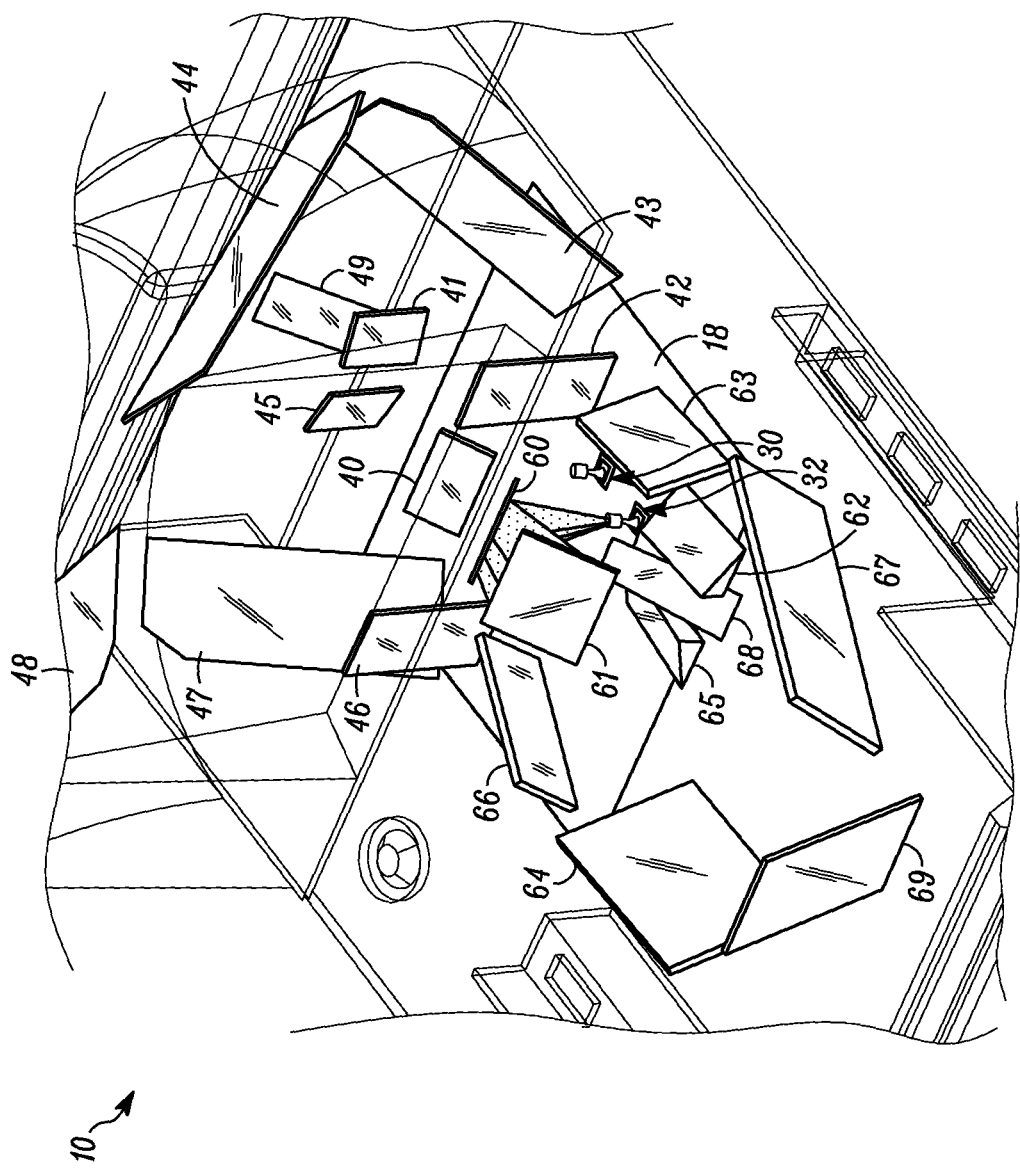
FIG. 8 is a broken-away, enlarged, perspective view of another part of the optical system in the workstation of FIG. 1 diagrammatically depicting part of another folded optical path of the field of view of another imager prior to reaching another optical splitter.
Figure 9:
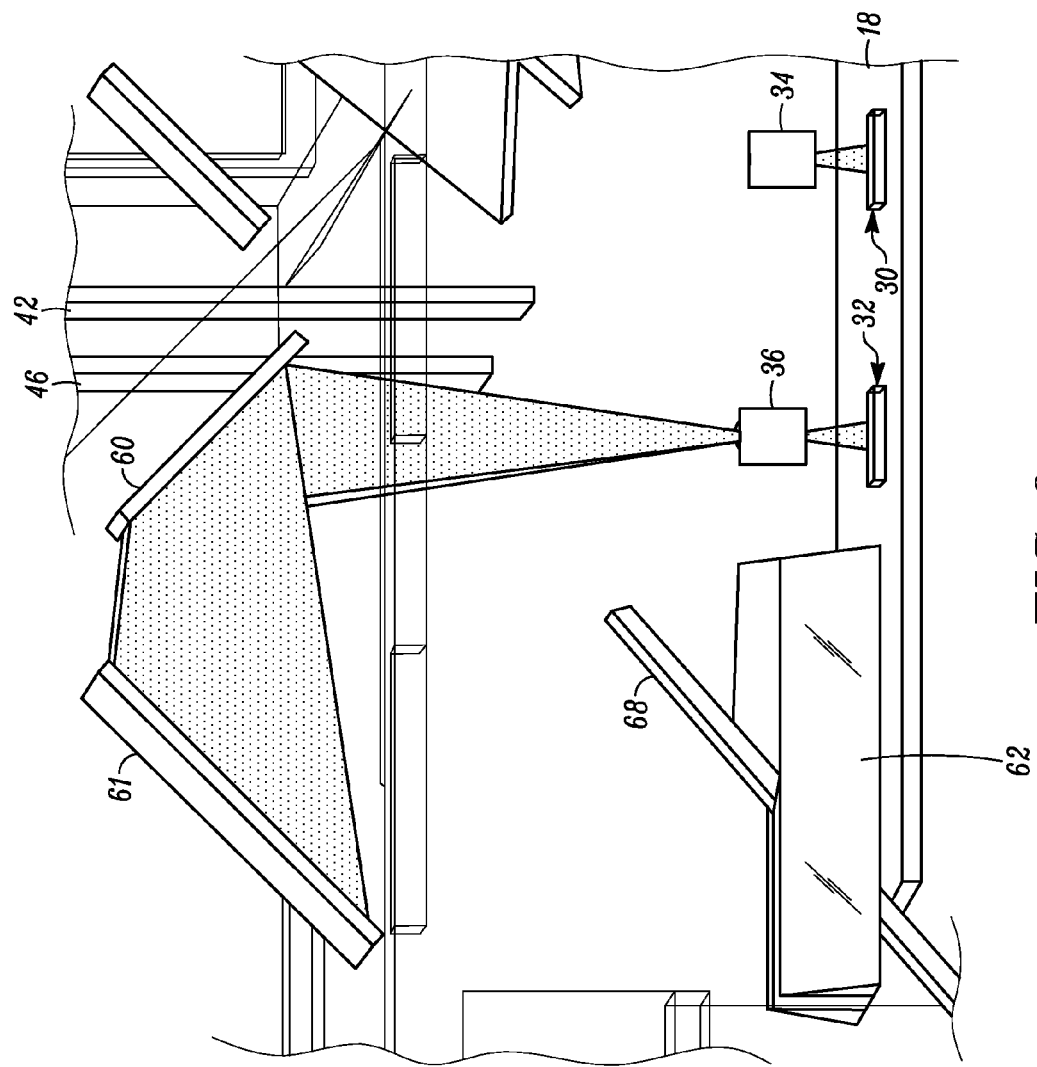
FIG. 9 is a side perspective, enlarged, view of the optical path part of FIG. 8.

Thus, the optical system, as best shown in FIGS. 8-9, includes a fourth plurality of fold mirrors 60, 61, 62, 63 and 64 that are positioned along a first optical path part between the horizontal imager 32 and the horizontal window 20 to fold the captured return light in the outer subfield 32R to successively reflect off mirrors 64, 63, 62, 61 and 60, in that order, prior to being focused by the imaging lens assembly 36 onto the horizontal imager 32. In analogous manner, a fifth plurality of fold mirrors 60, 61, 65, 66 and 67 are positioned along a second optical path part between the horizontal imager 32 and the horizontal window 20 to fold the captured return light in the outer subfield 32L to successively reflect off mirrors 67, 66, 65, 61 and 60, in that order, prior to being focused by the imaging lens assembly 36 onto the horizontal imager 32. A sixth plurality of fold mirrors 60, 61, 68 and 69 are positioned along a third optical path part between the horizontal imager 32 and the horizontal window 20 to fold the captured return light in the center subfield 32C to successively reflect off mirrors 69, 68, 61 and 60, in that order, prior to being focused by the imaging lens assembly 36 onto the horizontal imager 32.

The aforementioned mirrors 62, 65 and 68, as best seen in FIG. 8, comprise a second optical splitter, wherein the mirror 68 splits a central part of the field of view of the horizontal imager 32 into the center subfield 32C, wherein the mirror 62 splits an outer part of the field of view of the horizontal imager 32 into the outer subfield 32R, and wherein the mirror 65 splits another outer part of the field of view of the horizontal imager 32 into the outer subfield 32L.

Figure 10:
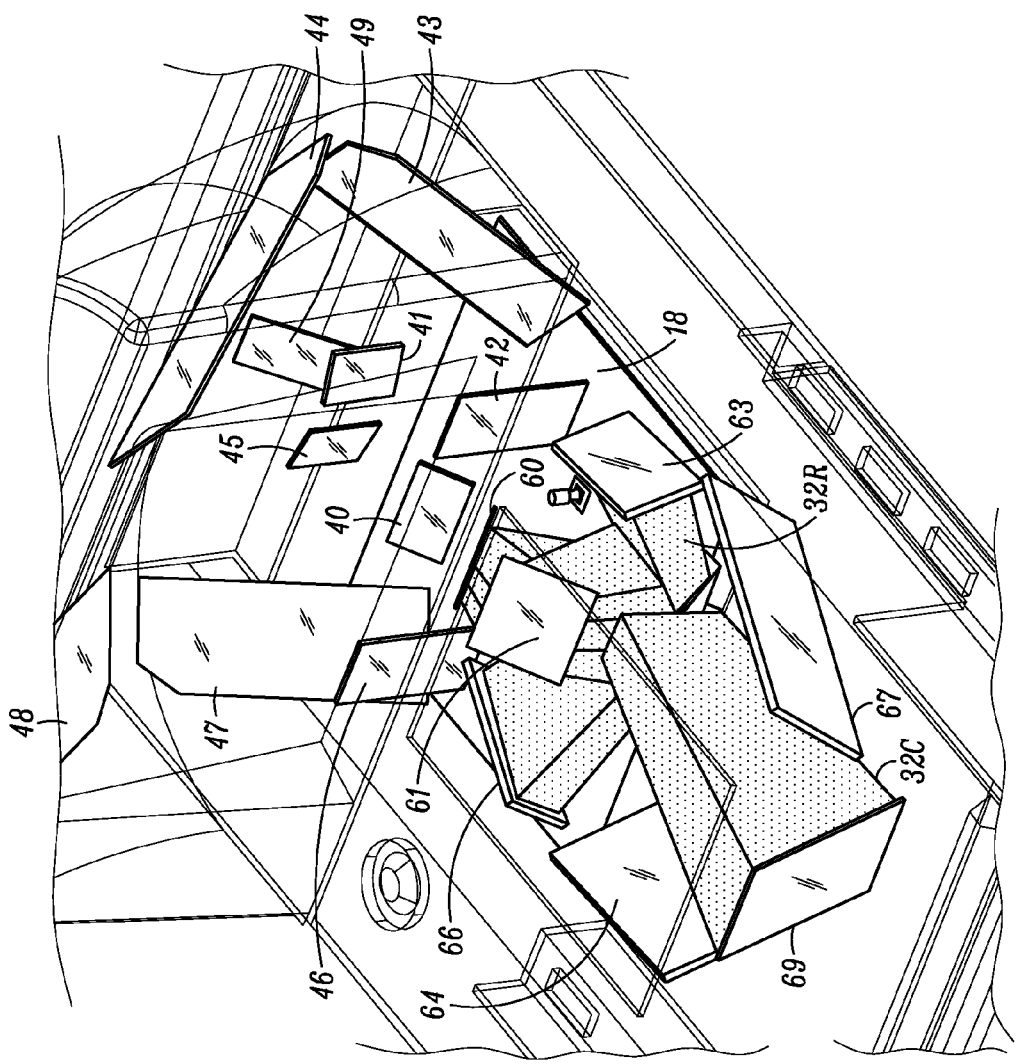
FIG. 10 is a perspective view diagrammatically depicting the subfields downstream of the optical splitter of FIG. 8.
Figure 11:
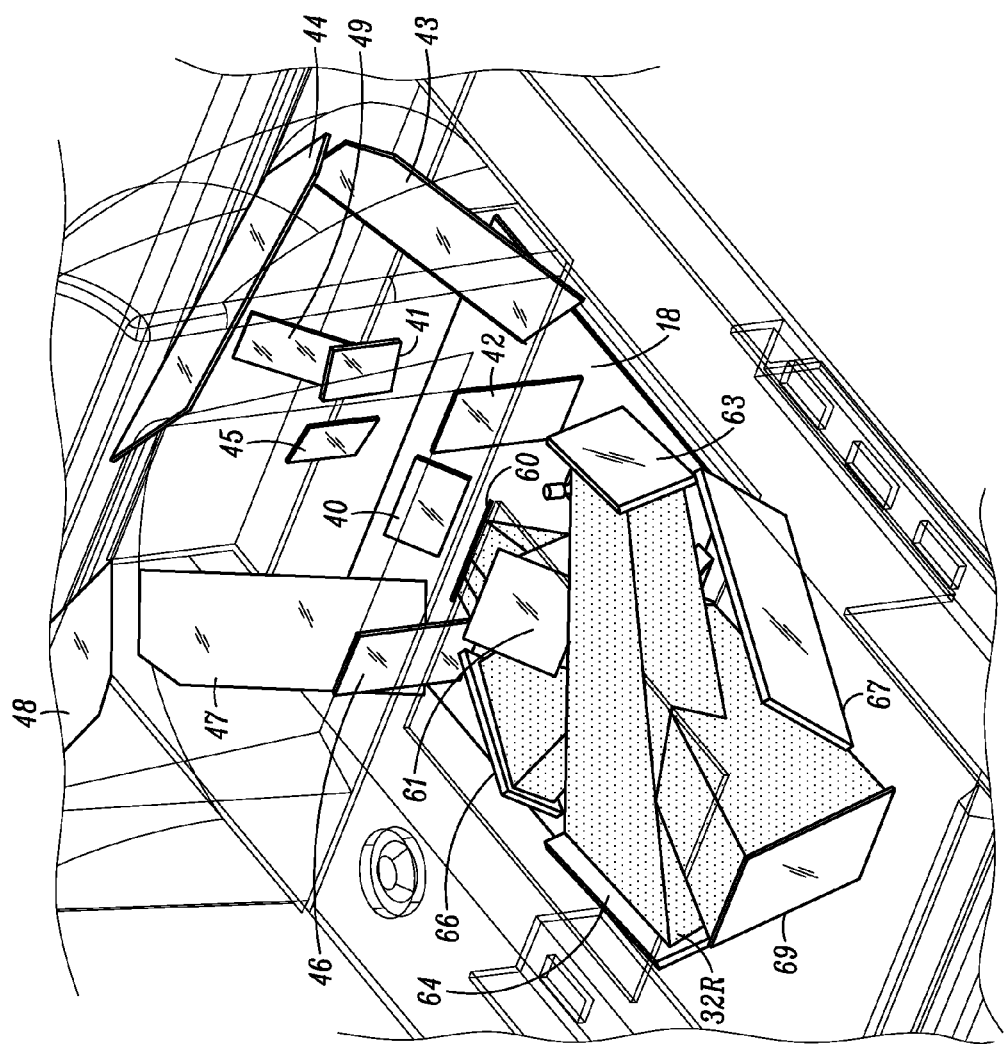
FIG. 11 is a perspective view diagrammatically depicting the subfields still further downstream of the optical splitter of FIG. 8.
Figure 12:
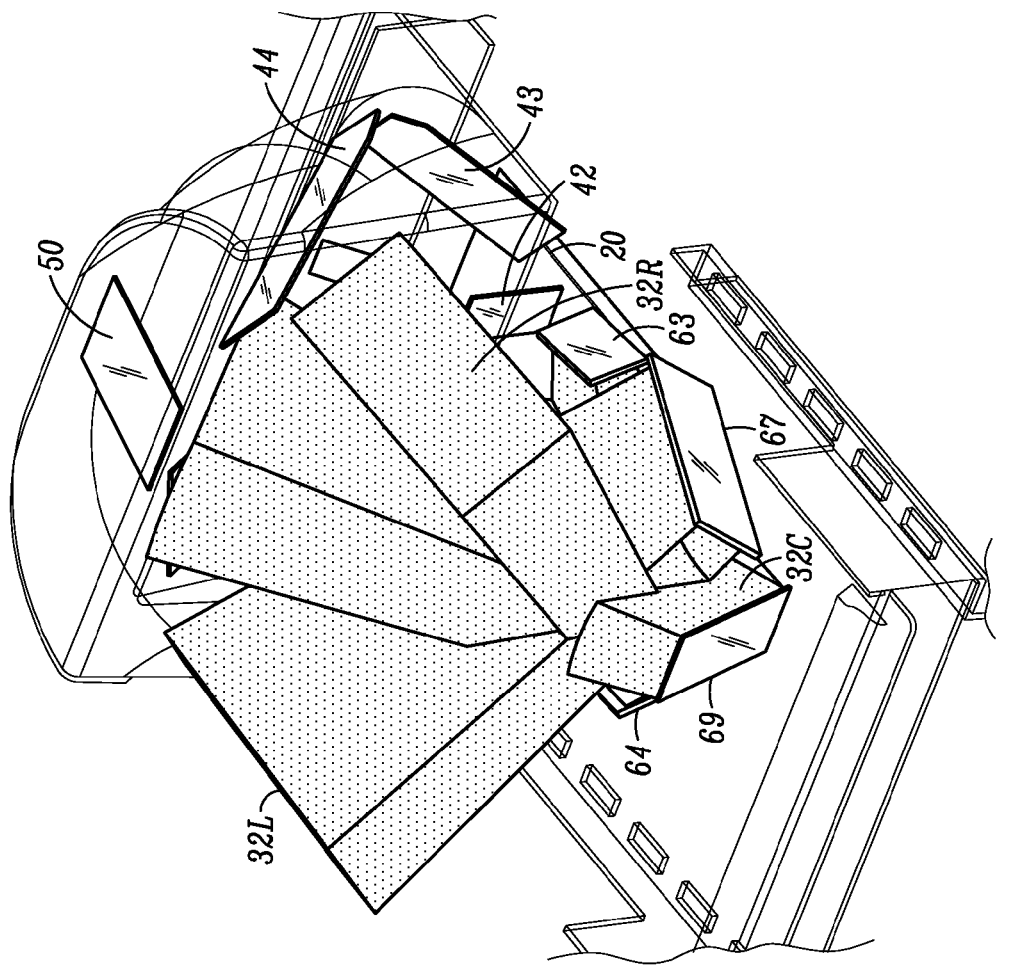
FIG. 12 is a perspective view of the other optical system part of FIG. 8 diagrammatically depicting three subfields exteriorly of the horizontal window of the workstation of FIG. 1.

FIG. 9 best depicts the folding of all three subfields between the mirrors 61 and 60 and the horizontal imager 32 away from the second optical splitter 62, 65 and 68. FIG. 10 best depicts the separate passage and folding of the outer subfield 32R between the mirrors 62 and 63, and also depicts the separate passage and folding of the outer subfield 32L between the mirrors 45 and 66, and also depicts the separate passage and folding of the central subfield 32C between the mirrors 68 and 69. FIG. 11 best depicts the separate passage and folding of the outer subfield 32R between the mirrors 63 and 64; in analogous manner, it will be understood that the outer subfield 32L passes between the mirrors 66 and 67 (not illustrated so as not to encumber the drawing). FIG. 12 best depicts the separate passage and folding of the outer subfield 32R through the horizontal window 20 and onto the mirror 64, and the separate passage and folding of the outer subfield 32L through the horizontal window 20 and onto the mirror 67, and the separate passage and folding of the central subfield 32C through the horizontal window 20 and onto the mirror 69.

The use of the aforementioned two optical splitters reduces the number of imagers in the workstation 10. Thus, only two imagers 30, 32 are preferably needed to produce the six subfields 30C, 30L, 30R, 32C, 32L and 32R depicted in FIG. 13. These six subfields provide optimum visibility of indicia 14 on the various sides of the product 12 being passed through the scan zone. The six subfields are oriented to be most effective for reading indicia on products oriented in the most common ways presented to the workstation by users. The six subfields provides redundant coverage for the indicia located in common positions on the products, thereby assuring maximum performance when used by typical users.

As best seen in FIG. 14, energizable illuminating assemblies or illuminators 70C1, 70C2 are mounted in spaced-apart elation rearwardly on board 18 for illuminating central subfield 30C; energizable illuminator 70R is mounted rearwardly on board 18 for illuminating outer subfield 30R; and energizable illuminator 70L is mounted rearwardly on board 18 for illuminating outer subfield 30L. Each illuminator is operative for illuminating its respective subfield with illumination light over an illumination field that overlaps and is generally commensurate with the respective subfield. Each illuminator preferably includes multiple illumination light sources, e.g., surface-mounted light emitting diodes (LEDs). The imaging lens assembly 34 is operative for capturing the illumination light returned from the indicia in each illuminated subfield 30C, 30R and 30L along respective optical paths from the upright window 22 to the vertical imager 30.

As explained in detail below, one aspect of this invention proposes providing a plurality of light-modifying elements, one for each illuminator. Each light-modifying element is operative for conditioning the illumination light from the plurality of LEDs of each illuminator to be generally uniform in light intensity over the illuminated subfield of view. Thus, as shown in FIG. 14, light-modifying elements 80C1, 80C2 at least partly overlie the illuminators 70C1, 70C2 to shape the outgoing illumination light and insure that the illumination light substantially fills the central subfield 30C; each light-modifying element 80R at least partly overlies the illuminators 70R to shape the outgoing illumination light and insure that the illumination light substantially fills the outer subfield 30R; and each light-modifying element 80L at least partly overlies the illuminators 70L to shape the outgoing illumination light and insure that the illumination light substantially fills the outer subfield 30L.

Figure 15:
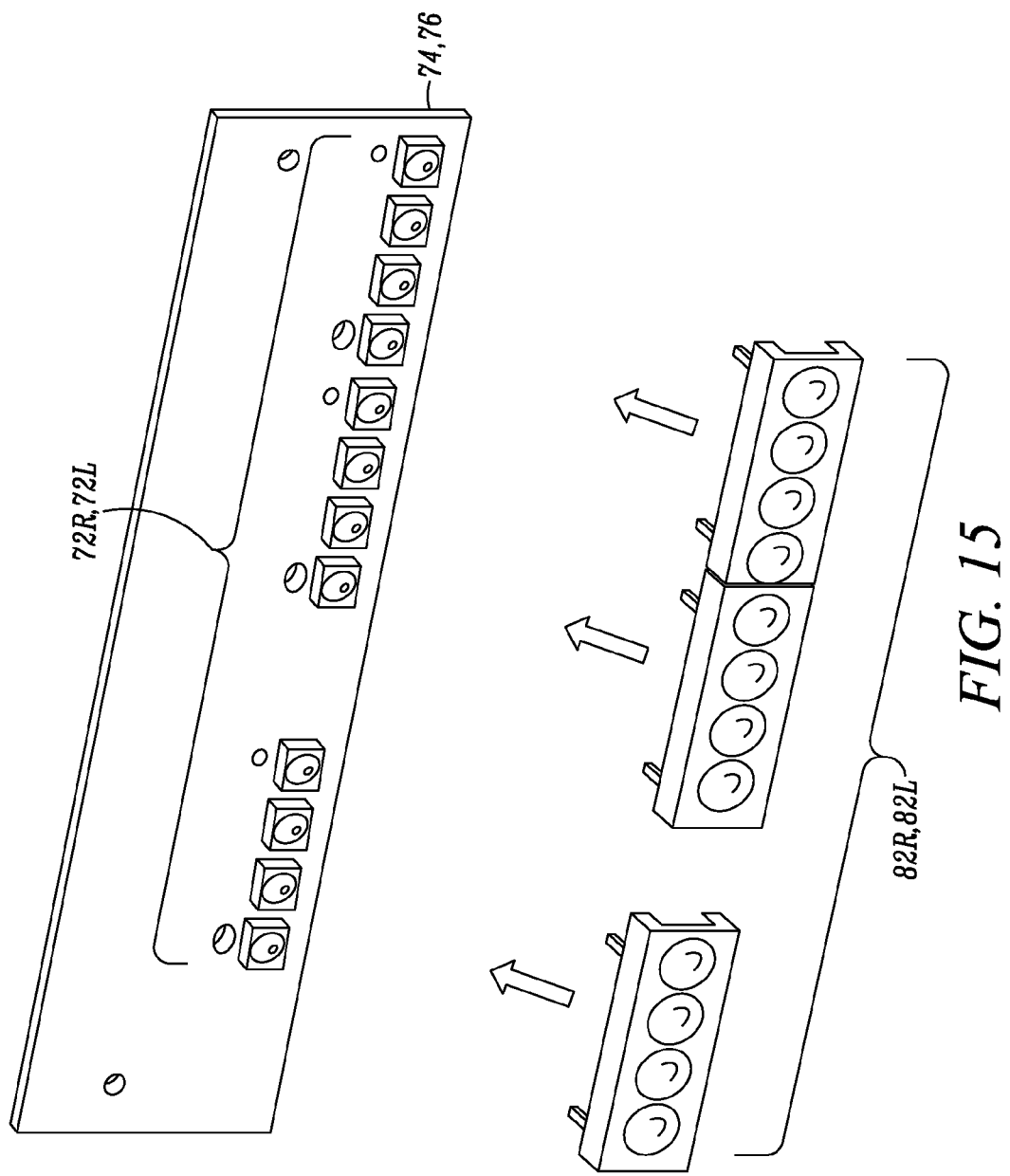
FIG. 15 is a perspective view of a representative illumination assembly and a plurality of light-modifying elements in accordance with said one embodiment of this invention commonly mounted on an auxiliary printed circuit board within the workstation of FIG. 1.
Figure 16:
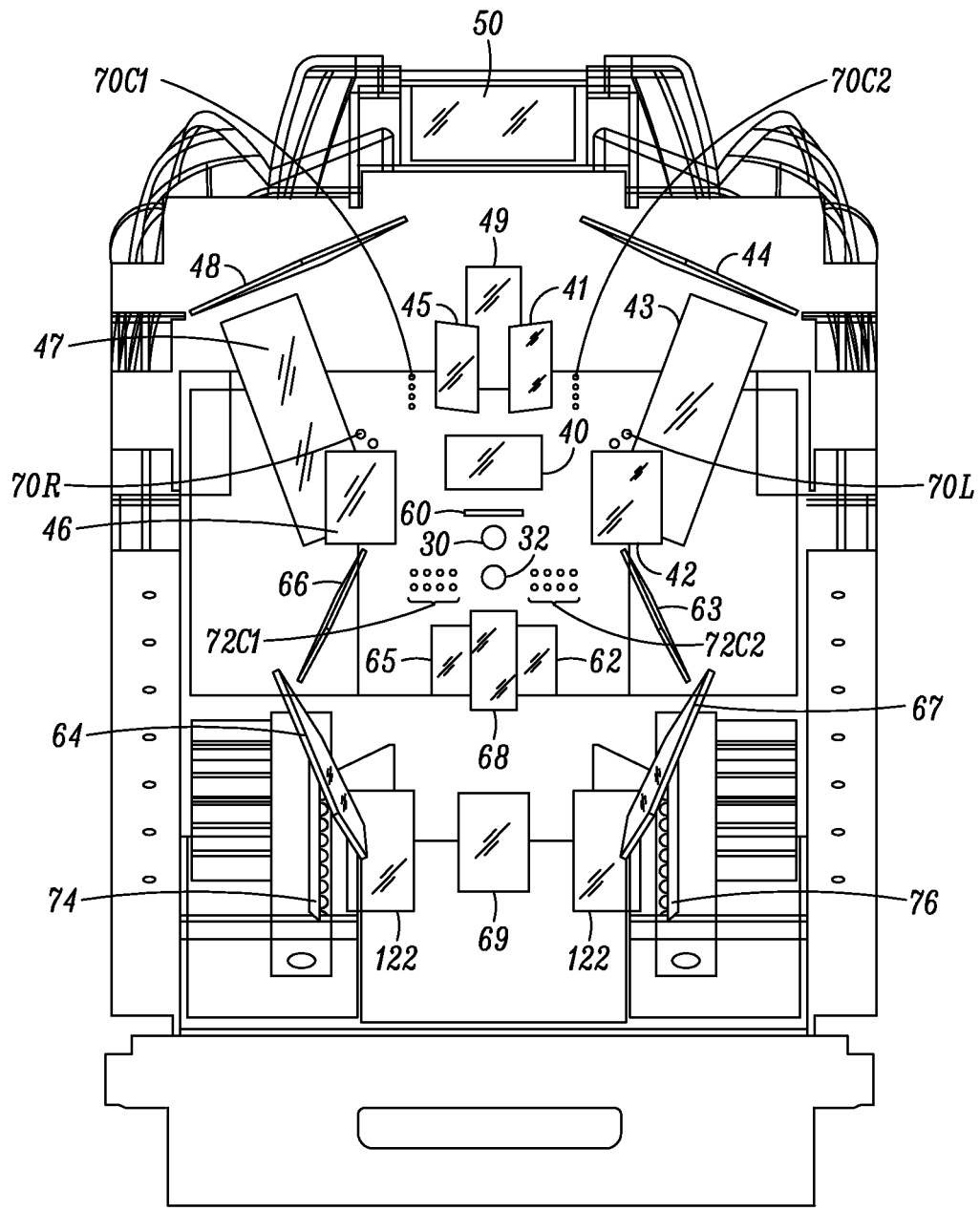
FIG. 16 is a top perspective view of the workstation of FIG. 1 depicting the placement of the illumination assemblies of FIGS. 14-15 within the workstation, with the light-modifying elements being omitted for clarity.

Analogously, as also seen in FIG. 14, energizable illuminators 72C1, 72C2 are mounted in spaced-apart relation forwardly on board 18 for illuminating central subfield 32C. Energizable illuminator 72R is mounted on an auxiliary printed circuit board 74 (shown in isolation in FIG. 15) for illuminating outer subfield 32R; and energizable illuminator 72L is mounted rearwardly on another auxiliary board 76 (again, see FIG. 15) for illuminating outer subfield 32L. FIG. 16 is an overhead view that shows the placement of the auxiliary boards 74, 76 in the workstation. Analogously to that described above, each illuminator 72C1, 72C2, 72R and 72L is operative for illuminating its respective subfield with illumination light over an illumination field that overlaps and is generally commensurate with the respective subfield. Each illuminator preferably includes multiple illumination light sources, e.g., surface-mounted light emitting diodes (LEDs). FIG. 15 shows such LEDs 72R or 72L on an enlarged scale The imaging lens assembly 36 is operative for capturing the illumination light returned from the indicia in each subfield 32C, 32R and 32L along respective optical paths from the horizontal window 22 to the horizontal imager 32.

Analogously, a plurality of additional light-modifying elements is provided, one for each additional illuminator. Each light-modifying element is operative for conditioning the illumination light from the plurality of LEDs of each illuminator to be generally uniform in light intensity over the illuminated subfield of view. Thus, as shown in FIG. 14, light-modifying elements 82C1, 82C2 at least partly overlie the illuminators 72C1, 72C2 to shape the outgoing illumination light and insure that the illumination light substantially fills the central subfield 32C. As shown in FIG. 15, each light-modifying element 82R at least partly overlies the illuminator 72R to shape the outgoing illumination light and insure that the illumination light substantially fills the outer subfield 32R; and each light-modifying element 82L at least partly overlies the illuminator 72L to shape the outgoing illumination light and insure that the illumination light substantially fills the outer subfield 32L.

A controller 24 or programmed microprocessor is mounted on the board 18 and is operatively connected to the imagers 30, 32 and the illuminators 70C1, 70C2, 70R, 70L, 72C1, 72C2, 72R and 72L for energizing each illuminator to illuminate each subfield of view, and for processing the captured illumination light in at least one of the subfields of view to read the indicia, and to decode the indicia if the indicia is a symbol. In one construction, the illuminators 70C1, 70C2, 70R and 70L are simultaneously energized as a first group, and thereafter, the illuminators 72C1, 72C2, 72R and 72L are simultaneously energized as a second group. In another construction, both groups are simultaneously energized.

In use, a user, such as a person working at a supermarket checkout counter, or a customer in a self checkout stand, processes the product 12 bearing the UPC symbol 14 thereon past the windows 20, 22 by swiping the product 12 across a respective window, or by presenting and momentarily holding the product 12 at the respective window. The symbol 14 may located on any of the top, bottom, right, left, front and rear, sides of the product 12, and at least one, or perhaps both, of the imagers 30, 32 will capture the illumination light reflected, scattered, or otherwise returning from the symbol 14 through one or both windows 20, 22. All three of the subfields 32C, 32R and 32L pass through the horizontal window 20 along different intersecting directions to read three sides of the product. All three of the subfields 30C, 30R and 30L pass through the upright window 22 along different intersecting directions to read three more sides of the product. As shown in FIG. 13, the six subfields substantially fully occupy the scan zone. All six subfields are individually illuminated by their dedicated illuminators.

FIGS. 17A-17D illustrate how a light-modifying element in accordance with one embodiment of this invention conditions the illumination light from the plurality of LEDs of each illuminator to be generally uniform in light intensity over each illuminated subfield. Thus, as shown in FIG. 17A, a single representative LED 100 and an overlying single representative light-modifying element or lens 102 are both symmetrically and concentrically arranged on a central optical axis 104 of the lens 102 to produce a light intensity waveform 106 whose intensity is maximum on the optical axis 104, and then falls off rapidly in both radial directions away from the optical axis 104. FIG. 17B shows the resulting waveform 108 if the LED 100 is radially offset to one side of the optical axis 104; and FIG. 17C shows the resulting waveform 110 if the LED 100 is radially offset to an opposite side of the optical axis 104.

FIG. 17D shows the resulting light intensity waveform 112 when a plurality of LEDs 100A, 100B are arranged in closely adjacent relationship, and are overlain by a closely adjacent plurality of lenses 102A, 102B. The LED 100A and the lens 102A are arranged as shown in FIG. 17B at one side of an illumination axis 114; and the LED 100B and the lens 102B are arranged as shown in FIG. 17C at an opposite side of the illumination axis 114. The light intensity waveform 112, as compared to the waveform 106 of FIG. 17A, has a flatter, longer top and, thus, is more uniform over a greater extent of the respective illuminated subfield.

FIG. 18 shows the representative illumination assembly 72R, 72L of FIG. 15, with the light-modifying elements 82R, 82L offset therefrom in accordance with the embodiment of FIG. 17D. The X, Y, Z coordinate axes are shown, together with the radial offset or shift S along the Y-axis.

FIGS. 19A-19D illustrate how a light-modifying element in accordance with another embodiment of this invention conditions the illumination light from the plurality of LEDs of each illuminator to be generally uniform in light intensity over each illuminated subfield. Thus, as shown in FIG. 19A, the single representative LED 100 and the overlying single representative light-modifying element or lens 102 are both symmetrically and concentrically arranged on the central optical axis 104 of the lens 102 to produce a light intensity waveform 106 whose intensity is maximum on the optical axis 104, and then falls off rapidly in both radial directions away from the optical axis 104. Instead of offsetting the LED 100 as described above in connection with FIGS. 17A-17D, a single representative light-modifying element or baffle 120 is offset. FIG. 19B shows the resulting waveform 116 if the baffle 120 is radially offset to one side of the optical axis 104; and FIG. 19C shows the resulting waveform 118 if the baffle 120 is radially offset to an opposite side of the optical axis 104.

FIG. 19D shows the resulting light intensity waveform 112 when a plurality of LEDs 100A, 100B are arranged in closely adjacent relationship, and are overlain by a closely adjacent plurality of lenses 102A, 102B. The LED 100A, the lens 102A and the baffle 120 are arranged as shown in FIG. 19B at one side of the illumination axis 114; and the LED 100B, the lens 102B and the baffle 120 are arranged as shown in FIG. 19C at an opposite side of the illumination axis 114. The light intensity waveform 112, as compared to the waveform 106 of FIG. 19A, has a flatter, longer top and, thus, is more uniform over a greater extent of the respective illuminated subfield.

Figure 20:
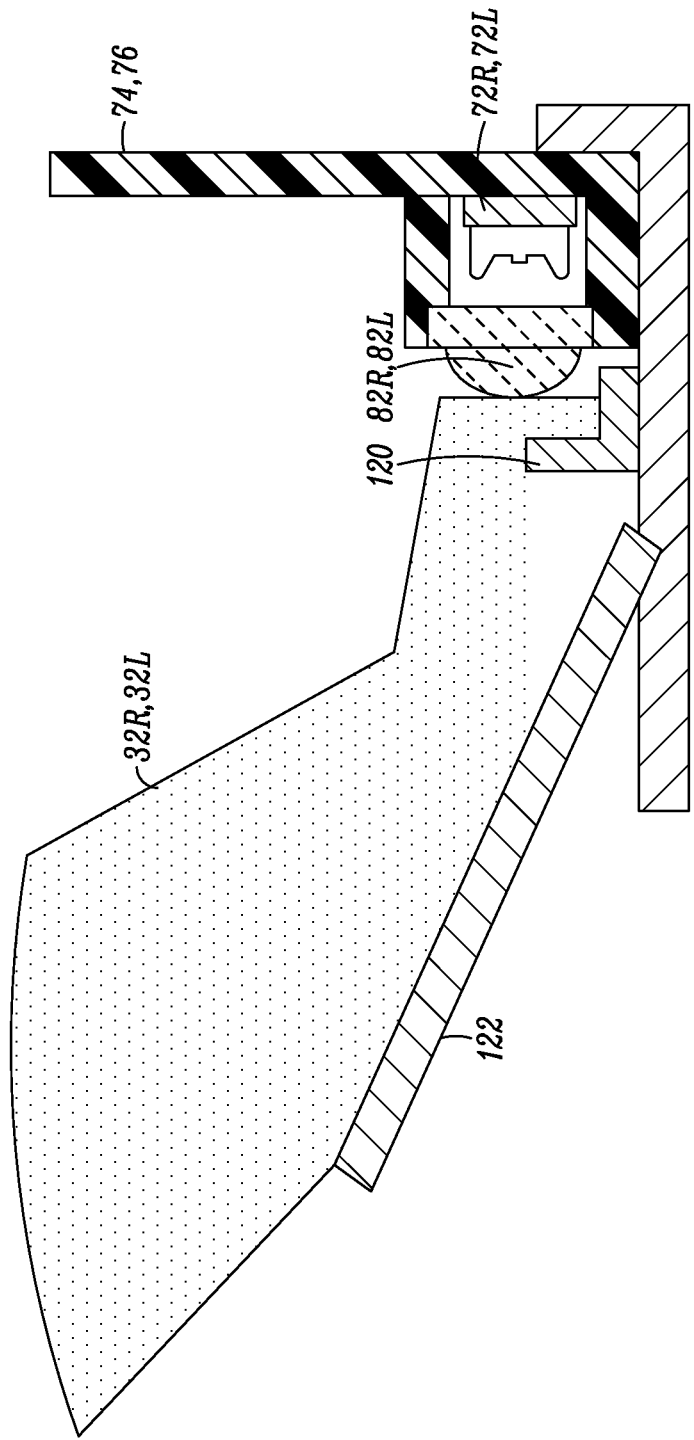
FIG. 20 is a side sectional view of the representative illumination assembly of FIG. 15, with both a light-modifying lens element and a light-modifying baffle element in accordance with another embodiment of this invention.

FIG. 20 shows the representative illumination assembly 72R, 72L of FIG. 15, as well as the representative light-modifying lens elements 82R, 82L, with the light-modifying baffle elements 120 radially offset therefrom in accordance with the embodiment of FIG. 19D. A plurality of fold mirrors 122 (see FIG. 16) direct the subfields 32R, 32L upwardly through the horizontal window.

In accordance with another feature of this invention, a point-of-transaction workstation for processing products by electro-optically imaging indicia associated with the products, comprises a housing having one window located in an upright plane, and another window located in a generally horizontal plane that intersects the upright plane. The windows bound an area in which each product is presented for processing. A plurality of solid-state imagers, one for each window, is supported by the housing, the imagers having respective arrays of image sensors with intersecting fields of view that extend through and past the windows to the indicia to be imaged. The workstation also has a plurality of illumination assemblies, one for each field of view, each illumination assembly having a plurality of illumination light sources for illuminating a respective field of view with illumination light over an illumination field that overlaps the respective field of view. The optical system being is further operative for capturing the illumination light returned from the indicia in each illuminated field of view. A controller operatively connected to the imager and the illumination assemblies, processes the captured illumination light in at least one of the illuminated fields of view. The workstation also has a plurality of light-modifying elements, one for each illumination assembly. Each light-modifying element is operative for conditioning the illumination light from the plurality of illumination light sources to be generally uniform in light intensity over the at least one illuminated field of view.

It will be understood that each of the elements described above, or two or more together, also may find a useful application in other types of constructions differing from the types described above. For example, the workstation need not be the illustrated dual window or bi-optical workstation described above, but could also be configured either as a handheld, portable scanner having a single window, or as a stand-mounted, stationary scanner having a single window, or as a vertical slot scanner having a single, generally vertically arranged, upright window, or as a flat-bed or horizontal slot scanner having a single, generally horizontally arranged window. As another example, the illustrated lenses 102 are grouped in quartets for ease of manufacture and assembly. They can also be formed as individual lenses, or can have any number of lenses in each group. As still another example, although the light-modifying elements were illustrated and described in connection with the illumination assemblies 72R, 72L, they can equally well be employed with any or all of the other illumination assemblies.

In accordance with another feature of this invention, a method of imaging indicia is performed by supporting a window on a housing, configuring a solid-state imager having an array of image sensors with a field of view that looks through the window, splitting the field of view of the imager into a plurality of intersecting subfields of view that extend through and past the window to the indicia to be imaged, illuminating the subfields of view with a plurality of illumination assemblies, one for each subfield of view, each illumination assembly having a plurality of illumination light sources for illuminating a respective subfield of view with illumination light over an illumination field that overlaps the respective subfield of view, capturing the illumination light returned from the indicia in each illuminated subfield of view, processing the captured illumination light in at least one of the illuminated subfields of view, and conditioning the illumination light from the plurality of illumination light sources to be generally uniform in light intensity over the at least one illuminated subfield of view.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims.

In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An apparatus for imaging indicia, comprising:
a housing;
a window supported by the housing;
a solid-state imager supported by the housing and having an array of image sensors with a field of view;
an optical system supported by the housing and operative for splitting the field of view of the imager into a plurality of intersecting subfields of view that extend through and past the window to the indicia to be imaged;
a plurality of illumination assemblies each comprising at least one LED, and arranged over each of said respective LEDs is a respective lens, one or more for each subfield view, each illumination assembly having a plurality of illumination light sources for illuminating a respective subfield of view with illumination light over an illumination field that overlaps the respective subfield of view, the optical system being further operative for capturing the illumination light returned from the indicia in each illuminated subfield of view;
a controller operatively connected to the imager and the illumination assemblies, for processing the captured illumination light in at least one of the illuminated subfields of view;
a plurality of light-modifying elements, one for each illumination assembly, each light-modifying element being operative for conditioning the illumination light from the plurality of illumination light sources to be generally uniform in light intensity over the at least one illuminated subfield of view; and
wherein each illumination light source emits an illumination light beam, wherein each illumination assembly has a pair of the illumination light sources in close adjacent relationship, wherein each light-modifying element includes either (1) a pair of lenses having respective optical axes and at least partly overlying the closely adjacent pair of the illumination light sources with each illumination light source being offset from a respective lens in a direction radially of a respective optical axis or (2) a pair of lenses having respective optical axes and overlying the closely adjacent pair of the illumination light sources, and a pair of baffles at least partly overlying the closely adjacent pairs of the illumination light sources and the lenses with each baffle being offset from a respective illumination light source and a respective lens in a direction radially of a respective optical axis, wherein the light-modifying elements are operable to combine the illumination light beams in a corresponding subfield of view into a combined light beam having an intensity that is generally uniform over the corresponding subfield of view.

2. The apparatus of claim 1, wherein the window is located in one of an upright plane and a generally horizontal plane; and further comprising an additional window located in the other of the upright plane and the generally horizontal plane, and an additional solid-state imager supported by the housing and having an additional array of sensors with an additional field of view.

3. The apparatus of claim 2, wherein the optical system includes an optical splitter for splitting the field of view of the imager into a set of the subfields of view that pass through the window, and an additional optical splitter for splitting the additional field of view of the additional imager into a set of the subfields of view that pass through the additional window.

4. The apparatus of claim 1, wherein the illumination light sources of each illumination assembly are light emitting diodes (LEDs) arranged in a row and commonly mounted on a printed circuit board.

5. A point-of-transaction workstation for processing products by electro-optically imaging indicia associated with the products, comprising:
a housing having one window located in an upright plane, and another window located in a generally horizontal plane that intersects the upright plane, the windows bounding an area in which each product is presented for processing;
a pair of solid-state imagers, one for each window, supported by the housing, the imagers having respective arrays of image sensors with intersecting fields of view that extend through and past the windows to the indicia to be imaged; an optical system supported by the housing and operative for splitting the field of view of the imagers into a plurality of intersecting subfields of view that extend through and past the windows to the indicia to be imaged;
a plurality of illumination assemblies each comprising at least one LED, and arranged over each of said respective LEDs is a respective lens, one or more for each subfield of view, each illumination assembly having a plurality of illumination light sources for illuminating a respective field of view with illumination light over an illumination field that overlaps the respective field of view, the optical system being further operative for capturing the illumination light returned from the indicia in each illuminated field of view;
a controller operatively connected to the imager and the illumination assemblies, for processing the captured illumination light in at least one of the illuminated fields of view;
a plurality of light-modifying elements, one for each illumination assembly, each light-modifying element being operative for conditioning the illumination light from the plurality of illumination light sources to be generally uniform in light intensity over the at least one illuminated field of view; and
wherein each illumination light source emits an illumination light beam, wherein each illumination assembly has a pair of the illumination light sources in close adjacent relationship, wherein each light-modifying element includes either (1) a pair of lenses having respective optical axes at least partly overlying the closely adjacent pair of the illumination light sources with each illumination light source being offset from a respective lens in a direction radially of a respective optical axis or (2) a pair of lenses having respective optical axes and overlying the closely adjacent pair of the illumination light sources, and a pair of baffles at least partly overlying the closely adjacent pairs of the illumination light sources and the lenses with each baffle being offset from a respective illumination light source and a respective lens in a direction radially of a respective optical axis, wherein the light-modifying elements are operable to combine the illumination light beams in a corresponding subfield of view into a combined light beam having an intensity that is generally uniform over the corresponding subfield of view.

6. The workstation of claim 5, and an optical system supported by the housing and operative for splitting the field of view of each imager into a plurality of intersecting subfields of view that extend through and past the windows to the indicia to be imaged.

7. The workstation of claim 6, wherein the optical system includes a pair of optical splitters, each for splitting the field of view of a respective imager into a set of the subfields of view that pass through a respective window.

8. The workstation of claim 5, wherein the illumination light sources of each illumination assembly are light emitting diodes (LEDs) arranged in a row and commonly mounted on a printed circuit board.

9. A method of imaging indicia, comprising:
supporting a window on a housing;
configuring a solid-state imager having an array of image sensors with a field of view that looks through the window;
splitting the field of view of the imager into a plurality of intersecting subfields of view that extend through and past the window to the indicia to be imaged;
illuminating the subfields of view with a plurality of illumination assemblies each comprising at least one LED, and arranged over each of said respective LEDs is a respective lens, one or more for each subfield of view, each illumination assembly having a plurality of illumination light sources for illuminating a respective subfield of view with illumination light over an illumination field that overlaps the respective subfield of view;
capturing the illumination light returned from the indicia in each illuminated subfield of view;
processing the captured illumination light in at least one of the illuminated subfields of view;
conditioning the illumination light from the plurality of illumination light sources to be generally uniform in light intensity over the at least one illuminated subfield of view;
wherein the illuminating is performed by energizing each illumination light source to emit an illumination light beam, and by arranging a pair of the illumination light sources of each illumination assembly in close adjacent relationship;
wherein the conditioning is performed by at least partly overlying the closely adjacent pair of the illumination light sources with a pair of lenses having respective optical axes; and
wherein the conditioning further includes either (1) offsetting each illumination light source from a respective lens in a direction radially of a respective optical axis or (2) overlying at least partly the closely adjacent pairs of the illumination light sources and the lenses with a pair of baffles while offsetting each baffle from a respective illumination light source and a respective lens in a direction radially of a respective optical axis, with the conditioning being performed to combine the illumination light beams in a corresponding subfield of view into a combined light beam having an intensity that is generally uniform over the corresponding subfield of view by a plurality of light-modifying elements, one for each illumination assembly.

10. The method of claim 9, and locating the window in one of an upright plane and a generally horizontal plane; and locating an additional window in the other of the upright plane and the generally horizontal plane, and configuring an additional solid-state imager having an additional array of sensors with an additional field of view.

11. The method of claim 10, wherein the splitting is performed by splitting a respective field of view of a respective imager into a set of the subfields of view that pass through a respective window.

12. The method of claim 9, and configuring the illumination light sources of each illumination assembly as light emitting diodes (LEDs), and by arranging and commonly mounting the LEDs in a row on a printed circuit board.

* * * * *